(12) United States Patent
Lindbo et al.

(10) Patent No.: US 11,851,275 B2
(45) Date of Patent: Dec. 26, 2023

(54) APPARATUS FOR RETRIEVING UNITS FROM A STORAGE SYSTEM

(71) Applicant: OCADO INNOVATION LIMITED, Hatfield (GB)

(72) Inventors: Lars Sverker Ture Lindbo, Harpenden (GB); Robert Rolf Stadie, Eversley (GB); Matthew Robert Whelan, London (GB); Christopher Richard James Brett, St Albans (GB)

(73) Assignee: OCADO INNOVATION LIMITED, Hatfield (GB)

( * ) Notice: Subject to any disclaimer, the term of this patent is extended or adjusted under 35 U.S.C. 154(b) by 172 days.

(21) Appl. No.: 17/078,689

(22) Filed: Oct. 23, 2020

(65) Prior Publication Data

US 2021/0047111 A1  Feb. 18, 2021

Related U.S. Application Data

(60) Continuation of application No. 16/902,459, filed on Jun. 16, 2020, now Pat. No. 10,913,602, which is a
(Continued)

(30) Foreign Application Priority Data

Aug. 9, 2013  (GB) ...................... 1314313

(51) Int. Cl.
*B65G 1/04* (2006.01)
*B65G 57/03* (2006.01)
*B65G 59/02* (2006.01)

(52) U.S. Cl.
CPC ......... *B65G 1/0464* (2013.01); *B65G 1/0492* (2013.01); *B65G 57/03* (2013.01); *B65G 59/02* (2013.01)

(58) Field of Classification Search
CPC .... B65G 1/0464; B65G 1/0492; B65G 57/03; B65G 59/02
See application file for complete search history.

(56) References Cited

U.S. PATENT DOCUMENTS 2,165,513 A    7/1939  Smith
2,701,065 A    2/1955  Bertel
(Continued)

FOREIGN PATENT DOCUMENTS

CH    640797       1/1984
CN    101139869    3/2008
(Continued)

OTHER PUBLICATIONS

International Search Report (PCT/ISA/210) dated Jan. 15, 2015, by the European Patent Office as the International Searching Authority for International Application No. PCT/GB2014/052273.
(Continued)

*Primary Examiner* — Saul Rodriguez
*Assistant Examiner* — Ashley K Romano
(74) *Attorney, Agent, or Firm* — Knobbe, Martens, Olson & Bear, LLP

(57) ABSTRACT

A storage system and a load handling device for lifting and moving containers stacked in the storage system are described. The storage system includes a plurality of rails or tracks arranged in a grid pattern above the stacks of containers. The grid pattern can include a plurality of grid spaces and each stack is located within a footprint of only a single grid space. The load handling device is configured to move laterally on the rails or tracks above the stacks. The load-handling device includes a container-receiving space located above the rails or tracks in use and a lifting device arranged to lift a container from a stack into the container-receiving space. The load handling device has a footprint
(Continued)

that, in use, occupies only a single grid space in the storage system.

38 Claims, 18 Drawing Sheets

Related U.S. Application Data division of application No. 15/905,360, filed on Feb. 26, 2018, now Pat. No. 10,829,302, which is a continuation of application No. 14/910,858, filed as application No. PCT/GB2014/052273 on Jul. 24, 2014, now Pat. No. 10,000,337.

(56) References Cited

U.S. PATENT DOCUMENTS

| | | | |
|---|---|---|---|
| 3,703,243 A | 11/1972 | Monk | |
| 3,800,963 A | 4/1974 | Holland | |
| 4,088,232 A | 5/1978 | Lilly et al. | |
| 4,470,742 A | 9/1984 | Schindler | |
| 4,998,595 A | 3/1991 | Yeh | |
| 5,020,621 A | 6/1991 | Martin | |
| 5,190,427 A | 3/1993 | Lai | |
| 5,201,819 A | 4/1993 | Shiraishi et al. | |
| 6,042,321 A | 3/2000 | Labell | |
| 6,429,016 B1 | 8/2002 | McNeil | |
| 6,572,319 B1 | 6/2003 | Simmons et al. | |
| 7,032,763 B1 | 4/2006 | Zakula et al. | |
| 7,381,022 B1 | 6/2008 | King | |
| 7,441,999 B2 | 10/2008 | Nakao et al. | |
| 7,686,176 B2 | 3/2010 | Murata | |
| 7,912,574 B2 | 3/2011 | Wurman et al. | |
| 8,628,289 B1 | 1/2014 | Benedict et al. | |
| 8,758,178 B2 | 6/2014 | Gunji et al. | |
| 9,002,506 B1 | 4/2015 | Agarwal et al. | |
| 9,026,269 B2 * | 5/2015 | Cross | B60L 50/40 |
| | | | 701/2 |
| 9,188,982 B2 | 11/2015 | Thomson | |
| 9,422,108 B2 | 8/2016 | Hognaland | |
| 9,886,036 B2 | 2/2018 | Douglas et al. | |
| 10,474,141 B2 | 11/2019 | Stadie et al. | |
| 2003/0229416 A1 * | 12/2003 | Tai | B65G 1/06 |
| | | | 700/213 |
| 2005/0191160 A1 | 9/2005 | Melin et al. | |
| 2005/0220573 A1 | 10/2005 | Benedict et al. | |
| 2005/0287038 A1 | 12/2005 | Dubrovsky et al. | |
| 2006/0095160 A1 | 5/2006 | Orita et al. | |
| 2008/0075566 A1 | 3/2008 | Benedict et al. | |
| 2008/0075568 A1 | 3/2008 | Benedict et al. | |
| 2008/0075569 A1 | 3/2008 | Benedict et al. | |
| 2008/0281717 A1 | 11/2008 | Kortelainen | |
| 2009/0074545 A1 | 3/2009 | Lert et al. | |
| 2009/0222159 A1 | 9/2009 | Bauer | |
| 2010/0316469 A1 | 12/2010 | Lert et al. | |
| 2011/0027059 A1 | 2/2011 | Benedict et al. | |
| 2011/0155487 A1 | 6/2011 | Nurmi et al. | |
| 2011/0168465 A1 * | 7/2011 | Starr | B60K 7/0007 |
| | | | 180/65.51 |
| 2011/0243698 A1 * | 10/2011 | Herold | B66C 19/002 |
| | | | 414/800 |
| 2012/0259482 A1 | 10/2012 | Klaus | |
| 2012/0272500 A1 | 11/2012 | Reuteler et al. | |
| 2014/0005933 A1 | 1/2014 | Fong et al. | |
| 2014/0017046 A1 | 1/2014 | Wieschemann et al. | |
| 2014/0086714 A1 | 3/2014 | Malik | |
| 2014/0288696 A1 * | 9/2014 | Lert | B65G 1/065 |
| | | | 700/216 |
| 2015/0098775 A1 | 4/2015 | Razumov | |
| 2015/0127143 A1 | 5/2015 | Lindbo et al. | |
| 2016/0145058 A1 | 5/2016 | Lindbo | |
| 2016/0194151 A1 | 7/2016 | Lindbo et al. | |
| 2016/0347545 A1 | 12/2016 | Lindbo et al. | |
| 2017/0101263 A1 * | 4/2017 | Schroer | B65G 1/0407 |
| 2017/0129702 A1 | 5/2017 | Hognaland | |
| 2017/0129703 A1 | 5/2017 | Lindbo et al. | |
| 2017/0355524 A1 | 12/2017 | Hognaland | |
| 2018/0050869 A1 | 2/2018 | Lindbo et al. | |
| 2018/0148259 A1 | 5/2018 | Gravelle et al. | |
| 2018/0178980 A1 | 6/2018 | Lindbo et al. | |
| 2018/0178981 A1 | 6/2018 | Lindbo et al. | |
| 2018/0194571 A1 | 7/2018 | Fryer et al. | |
| 2018/0319590 A1 | 11/2018 | Lindbo et al. | |
| 2019/0009984 A1 | 1/2019 | Hognaland et al. | |
| 2019/0031446 A1 | 1/2019 | Hognaland et al. | |
| 2019/0225436 A1 | 7/2019 | Lindbo et al. | |
| 2019/0232925 A1 | 8/2019 | Hognaland et al. | |
| 2019/0300286 A1 | 10/2019 | Hognaland et al. | |
| 2019/0322452 A1 | 10/2019 | Austrheim et al. | |
| 2019/0375590 A1 | 12/2019 | Gravelle et al. | |
| 2020/0002091 A1 | 1/2020 | Shields et al. | |
| 2020/0087065 A1 | 3/2020 | Gravelle et al. | |
| 2020/0148470 A1 | 5/2020 | Austrheim | |
| 2020/0216263 A1 | 7/2020 | Fjeldheim et al. | |
| 2020/0223633 A1 | 7/2020 | Stadie et al. | |
| 2020/0290803 A1 | 9/2020 | Austrheim | |
| 2020/0290804 A1 | 9/2020 | Fjeldheim et al. | |
| 2020/0324971 A1 | 10/2020 | Ingram-Tedd et al. | |
| 2020/0363819 A1 | 11/2020 | Stadie et al. | |
| 2020/0399060 A1 | 12/2020 | Whelan et al. | |

FOREIGN PATENT DOCUMENTS

| | | |
|---|---|---|
| CN | 101276773 | 10/2008 |
| CN | 201882525 | 6/2011 |
| CN | 103101737 | 5/2013 |
| CN | 103171851 | 6/2013 |
| CN | 103287776 | 9/2013 |
| CN | 103612882 | 3/2014 |
| DE | 4203823 | 8/1993 |
| DE | 19849391 | 5/2000 |
| DE | 19935742 A1 | 2/2001 |
| DE | 102009050585 | 10/2009 |
| DE | 102009017241 A1 | 10/2010 |
| DE | 202009014456 | 3/2011 |
| EP | 0034154 | 8/1981 |
| EP | 0767113 A2 | 4/1997 |
| EP | 2020388 | 2/2009 |
| EP | 2308778 | 4/2011 |
| EP | 2450296 | 5/2012 |
| EP | 2548822 | 12/2014 |
| FR | 2710330 | 3/1995 |
| FR | 2730715 | 8/1996 |
| GB | 2514930 A | 12/2014 |
| JP | S49-83778 U | 7/1974 |
| JP | 03-117417 | 5/1991 |
| JP | H3-139144 A | 6/1991 |
| JP | H0490957 | 3/1992 |
| JP | 05-054412 U | 7/1993 |
| JP | H06263329 | 9/1994 |
| JP | H10203647 A | 8/1998 |
| JP | H10250978 | 9/1998 |
| JP | H10299280 | 11/1998 |
| JP | H11278607 | 10/1999 |
| JP | 2002202816 | 7/2002 |
| JP | 2005206371 | 8/2005 |
| NO | 317366 | 10/2004 |
| NO | 317366 B1 | 10/2004 |
| NO | 20121488 | 6/2014 |
| NO | 20140773 | 12/2015 |
| WO | 9849075 A1 | 11/1998 |
| WO | WO2002/000542 | 1/2002 |
| WO | WO2005/077789 | 8/2005 |
| WO | WO2006/095047 | 9/2006 |
| WO | WO2007/007354 | 1/2007 |
| WO | WO2007/043129 | 4/2007 |
| WO | 2013167907 A1 | 11/2013 |
| WO | 2014090684 A1 | 6/2014 |
| WO | 2014195901 A1 | 12/2014 |
| WO | 2014203126 A1 | 12/2014 |
| WO | WO2014/195902 | 12/2014 |

(56) References Cited

FOREIGN PATENT DOCUMENTS

| WO | WO2015/127828 | 9/2015 |
|---|---|---|
| WO | WO2015/140216 | 9/2015 |
| WO | WO2015/193278 | 12/2015 |

OTHER PUBLICATIONS

United Kingdom Search Report dated Feb. 10, 2015.
Third Party Observation for Application No. EP20190178591, 6 pages (Nov. 27, 2019).
Third Party Observation for Application No. EP20190178591, 6 pages (May 22, 2020).
Response to EPC 94/3 and first Third Party Observation for Application No. EP20190178591, 2pages (Jan. 30, 2020).
Petitioner's Sur-Reply to Patent Owner's Motion to Amend, *Autostore System Inc.* v. *Ocado Innovation Limited*, Inter Partes Review No. IPR2022-00673, dated May 24, 2023, in 33 pages.
Patent Owner's Motion to Exclude, *Autostore System Inc.* v. *Ocado Innovation Limited*, Inter Partes Review No. IPR2022-00673, dated May 24, 2023, in 21 pages.
Petitioner's Opposition to Patent Owner's Motion to Exclude, *Autostore System Inc.* v. *Ocado Innovation Limited*, Inter Partes Review No. IPR2022-00673, dated May 31, 2023, in 25 pages.
Patent Owner's Reply in Support of Its Motion to Exclude, *Autostore System Inc.* v. *Ocado Innovation Limited*, Inter Partes Review No. IPR2022-00673, dated Jun. 7, 2023, in 13 pages.
Decision of Technical Board of Appeal in Appeal to Oppositions to European Patent No. 3030504, dated Jan. 26, 2023, in 28 pages.
Third Party Observations for European Patent No. 4101791, dated Dec. 15, 2022, in 5 pages.
Opposition to European Patent No. 4101791, dated Jan. 18, 2023, in 18 pages.
Martini, "Systemvergleich Innovativer Konzepte der Automatischen Kleinteillagerung", Universität Siegen, dated Jul. 2011, in 232 pages.
Opposition to European Patent No. 3967629, dated Feb. 18, 2023, in 31 pages.
Response by Patentee to Oppositions of European Patent No. 3795501, dated Apr. 11, 2023, in 131 pages.
Ex. 1020 Transcript of Deposition of Dr. Brian Pfeifer, *Autostore System Inc.* v. *Ocado Innovation Limited*, Inter Partes Review No. IPR2022-00673, dated Mar. 9, 2023, in 52 pages.
Ex. 1023 Second Declaration of Dr. Jason Janét, *Autostore System Inc.* v. *Ocado Innovation Limited*, Inter Partes Review No. IPR2022-00673, dated Mar. 15, 2023, in 21 pages.
Reply to Patent Owner's Response, *Autostore System Inc.* v. *Ocado Innovation Limited*, Inter Partes Review No. IPR2022-00673, dated Mar. 15, 2023, in 38 pages.
Petitioner's Opposition to Patent Owner's Motion to Amend, *Autostore System Inc.* v. *Ocado Innovation Limited*, Inter Partes Review No. IPR2022-00673, dated Mar. 15, 2023, in 36 pages.
Preliminary Guidance from Board on Patent Owner's Motion to Amend, *Autostore System Inc.* v. *Ocado Innovation Limited*, Inter Partes Review No. IPR2022-00673, dated Apr. 12, 2023, in 17 pages.
Pan et al., "Motion Planning for Mobile Robots in a Dynamic Environment with Moving Obstacles," IEEE Int'l Conf. on Robotics & Automation, dated 1990, in 6 pages.
Bennewitz et al., "Optimizing Schedules for Prioritized Path Planning of Multi-Robot Systems," IEEE Int'l Conf. on Robotics & Automation, May 21-26, 2001, in 6 pages.
"Brushless Pancake Motors," http://www.printedmotors.com/brushless-pancake-motors, dated Jul. 12, 2014, in 3 pages.
"Protean Electric's Gearless, Direct-Drive System: An In-Wheel Motor Concept," TechieTonics, http://www.techietonics.com/futuretech-tonics/protean-electrics-gearless-direct-drive-system-an-in-wheel-motor-concept.html, posted by Pooja Kashyap, dated Mar. 21, 2014, in 4 pages.
Autostore Logistic—Technical Presentation, HattelandSolutions, Youtube, dated Aug. 26, 2009, in 1 page.
Christensen, "Designing In-Hub Brushless Motors," dated Jul. 22, 2014, in 5 pages.
Examining Division Remarks on Relevance of Third-Party Observation of May 22, 2020 for European Patent Application No. 19178591.4, filed Jun. 8, 2020, in 1 page.
Examining Division Remarks on Relevance of Third-Party Observation of Jun. 24, 2020, for European Patent Application No. 19178591.4, filed Jul. 23, 2020, in 2 pages.
First Opposition to European Patent No. 3030504, dated Nov. 5, 2018, in 61 pages.
First Opposition to European Patent No. 3293129, dated Aug. 24, 2020, in 63 pages.
First Opposition to European Patent No. 3299316, dated Jul. 6, 2020, in 59 pages.
First Set of Third Party Observations for European Patent Application No. 19178591.4, dated Jun. 24, 2020, in 4 pages.
Opponent Observations in Opposition to European Patent No. 3030504, dated Apr. 4, 2020, in 13 pages.
Patent Owner Observations in Oppositions against European Patent No. 3030504, dated Apr. 3, 2020, in 51 pages.
Patent Owner Reply to Opponent Observations in Oppositions to European Patent No. 3030504, dated Jun. 1, 2020, in 98 pages.
PCT Third Party Observations for PCT Application PCT/GB2014/052273, filed Jun. 4, 2015, in 26 pages.
Preliminary Opinion of Opposition Division in Oppositions to European Patent No. 3030504, dated Oct. 10, 2019, in 12 pages.
Reply to Oppositions to European Patent No. 3030504, dated Mar. 26-27, 2019, in 60 pages.
Reply to Oppositions to European Patent No. 3293129, dated Apr. 26, 2021, in 68 pages.
Reply to Third Party Observations for European Patent Application No. 19178591.4, dated Jul. 2, 2020, in 2 pages.
Second Opposition to European Patent No. 3030504, dated Nov. 7, 2018, in 19 pages.
Second Opposition to European Patent No. 3293129, dated Aug. 27, 2020, in 21 pages.
Second Opposition to European Patent No. 3299316, dated Jul. 9, 2020, in 27 pages.
Second Set of Third Party Observations for European Patent Application No. 19178591.4, dated Jun. 24, 2020, in 3 pages.
U.K. Patent Application No. GB1310784.2, filed Jun. 17, 2013, in 31 pages.
U.K. Patent Application No. GB1404870.6, filed Mar. 18, 2014, in 37 pages.
Written Opinion (PCT/ISA/237) dated Jan. 15, 2015, by the European Patent Office as the International Searching Authority for International Application No. PCT/GB2014/052273.
Wulfraat, "Swisslog Autostore: An In-Depth Review of Automated Split Case Picking Technology for Distribution Centers," Jun. 2012, in 27 pages.
Complaint for Patent Infringement with Exhibits, *Ocado Innovation Ltd. and Ocado Solutions Ltd.* vs. *Autostore AS and Autostore System Inc.*, Case No. 1:21-cv-00041-JL, filed Jan. 17, 2021, in 570 pages (two uploads).
Written Statement of Dr. Sheikh Shakeel Ahmad about Drawings for PCT/GB2014/052273, dated Dec. 3, 2020, in 23 pages.
First Opponent Remarks in Advance of Oral Proceedings in Opposition to European Patent No. 3030504, dated Nov. 18, 2020, in 22 pages.
Second Opponent Remarks in Advance of Oral Proceedings in Opposition to European Patent No. 3030504, dated Nov. 20, 2020, in 5 pages.
Patent Owner Remarks in Advance of Oral Proceedings in Opposition to European Patent No. 3030504, dated Jan. 14, 2021, in 65 pages.
Results of Oral Proceedings in Opposition to European Patent No. 3030504, dated Jan. 21, 2021, in 6 pages.
Minutes of Oral Proceedings in Opposition to European Patent No. 3030504, dated May 10, 2021, in 6 pages.
Interlocutory Decision in Opposition to European Patent No. 3030504, dated May 10, 2021, in 34 pages.
Reply to Oppositions to European Patent No. 3299316, dated Dec. 9, 2020, in 74 pages.

(56) References Cited

OTHER PUBLICATIONS

Opposition to European Patent No. 3556689, dated Nov. 19, 2020, in 30 pages.
Patent Owner Statement of Grounds of Appeal from Interlocutory Decision in Opposition to European Patent No. 3030504, dated Sep. 20, 2021, in 6 pages.
Opponent Grounds of Appeal from Interlocutory Decision in Opposition to European Patent No. 3030504, dated Sep. 20, 2021, in 36 pages.
Response by Patent Owner to Grounds of Appeal by Opponent from Interlocutory Decision in Opposition to European Patent No. 3030504, dated Feb. 4, 2022, in 26 pages.
Response by Opponent to Patent Owner Grounds of Appeal from Interlocutory Decision in Opposition to European Patent No. 3030504, dated Feb. 4, 2022, in 3 pages.
Boards of Appeal Summons to Oral Proceedings and Introductory Remarks and Preliminary Conclusion in Appeal from Interlocutory Decision in Opposition to European Patent No. 3030504, dated May 6, 2022, in 22 pages.
Comments on Preliminary Opinion by Opponent in Preparation for Oral Proceedings in Appeal from Interlocutory Decision in Opposition to European Patent No. 3030504, dated Dec. 21, 2022, in 8 pages.
Minutes of Oral Proceedings in Appeal from Interlocutory Decision in Opposition to European Patent No. 3030504, dated Jan. 31, 2023, in 7 pages.
Preliminary Opinion of Opposition Division in Oppositions to European Patent No. 3299316, dated Feb. 17, 2022, in 27 pages.
Patent Owner Observations on Preliminary Opinion and Additional Auxilary Requests in Oppositions to European Patent No. 3299316, dated Sep. 8, 2022, in 22 pages.
Opponent Observations on Preliminary Opinion in Oppositions to European Patent No. 3299316, dated Sep. 9, 2022, in 6 pages.
Opponent Submissions in Advance of Oral Proceedings in Oppositions to European Patent No. 3299316, dated Nov. 1, 2022, in 4 pages.
Board Decision and Minutes of Oral Proceedings in Oppositions to European Patent No. 3299316, dated Dec. 23, 2022, in 32 pages.
Preliminary Opinion of Opposition Division in Oppositions to European Patent No. 3293129, dated Feb. 17, 2022, in 25 pages.
Patent Owner Observations on Preliminary Opinion and Additional Auxilary Requests in Oppositions to European Patent No. 3293129, dated Sep. 8, 2022, in 12 pages.
Opponent Observations on Preliminary Opinion in Oppositions to European Patent No. 3293129, dated Sep. 9, 2022, in 6 pages.
Patent Owner Reply to Objections and Additional Auxilary Requests in Oppositions to European Patent No. 3293129, dated Oct. 31, 2022, in 10 pages.
Opponent Submissions in Advance of Oral Proceedings in Oppositions to European Patent No. 3293129, dated Nov. 1, 2022, in 5 pages.
Board Decision and Minutes of Oral Proceedings in Oppositions to European Patent No. 3293129, dated Feb. 10, 2023, in 39 pages.
Additional Arguments in Opposition to European Patent No. 3556689, dated Jun. 9, 2021, in 6 pages.
Patent Owner Response to Opposition to European Patent No. 3556689, dated Nov. 3, 2021, in 147 pages.
Preliminary Opinion of Opposition Division in Opposition to European Patent No. 3556689, dated Apr. 25, 2022, in 28 pages.
Opponent Submissions in Advance of Oral Proceedings in Opposition to European Patent No. 3556689, dated Jan. 20, 2023, in 11 pages.
Patent Owner Request to Revoke European Patent No. 3556689, dated Jan. 20, 2023, in 1 page.
Third Party Observations for European Publication No. 3795501, dated May 11, 2021, in 3 pages.
Patent Owner Reply to Communication from Examining Division and Third Party Observations for European Publication No. 3795501, dated May 21, 2021, in 3 pages.
Third Party Objections for European Publication No. 3795501, dated Jul. 14, 2021, in 4 pages.
AutoStore Request to Stay Proceeding in view of Instituted Entitlement Proceedings in UK for European Publication No. 3795501, dated Jul. 16, 2021, in 59 pages.
Patent Owner Reply to AutoStore Request to Stay Proceeding in view of Instituted Entitlement Proceedings in UK for European Publication No. 3795501, dated Jul. 21, 2021, in 7 pages.
Stay of Proceeding Pursuant to Rule 14(1) EPC for European Publication No. 3795501, dated Jul. 22, 2021, in 3 pages.
Patent Owner Response to Stay of Proceeding Pursuant to Rule 14(1) EPC for European Publication No. 3795501, dated Aug. 2, 2021, in 308 pages.
Communication Concerning Stay and Resumption of Proceedings Pursuant to Rule 14(1) EPC for European Publication No. 3795501, dated Aug. 11, 2021, in 5 pages.
Request for Resumption of Grant Proceedings for European Publication No. 3795501, dated Nov. 10, 2021, in 4 pages.
Communication Confirming Withdrawl of Entitlement Action in UK for European Publication No. 3795501, dated Nov. 19, 2021, in 4 pages.
Resumption of Grant Proceedings Under Rule 14 EPC for European Publication No. 3795501, dated Nov. 24, 2021, in 3 pages.
First Opposition to European Patent No. 3795501, dated Feb. 16, 2022, in 6 pages.
Second Opposition to European Patent No. 3795501, dated Nov. 16, 2022, in 36 pages.
Additional Annex for Second Opposition to European Patent No. 3795501, dated Feb. 1, 2023, in 4 pages.
Amended Complaint for Patent Infringement with Exhibits, *Ocado Innovation Ltd. and Ocado Solutions Ltd.* vs. *Autostore AS and Autostore System Inc.*, Case No. 1:21-cv-00041-JL, filed Feb. 16, 2021, in 585 pages (two uploads).
Defendant's Motion to Dismiss with Memorandum of Law in Support of Motion and Exhibits, *Ocado Innovation Ltd. and Ocado Solutions Ltd.* vs. *Autostore AS and Autostore Systems, Inc.*, Case No. 1:21- cv-00041-JL, filed Mar. 22, 2021, in 121 pages.
Second Amended Complaint for Patent Infringement with Exhibits, *Ocado Innovation Ltd. and Ocado Solutions Ltd.* vs. *Autostore AS and Autostore System Inc.*, Case No. 1:21-cv-00041-JL, filed Apr. 23, 2021, in 790 pages (two uploads).
Defendant's Partially Renewed Motion to Dismiss with Memorandum of Law in Support of Partially Renewed Motion and Exhibits, *Ocado Innovation Ltd. and Ocado Solutions Ltd.* vs. *Autostore AS and Autostore Systems, Inc.*, Case No. 1:21-cv-00041-JL, filed May 7, 2021, in 111 pages.
Plaintiffs' Opposition to Defendant's Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed May 21, 2021, in 37 pages.
Jacobs, Theo et al., "Design of wheel modules for non-holonomic, omnidirectional mobile robots in context of the emerging control problems", Robotik 2012, pp. 135-138.
Defendant's Reply in Support of Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed May 28, 2021, in 18 pages.
Defendant's Notice of Supplemental Authority in Support of Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Jun. 22, 2021, in 21 pages.
Plaintiff's Notice of Supplemental Authority in Opposition to Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Jun. 23, 2021, in 38 pages.
Defendant's Notice of Supplemental Authority in Support of Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Jul. 29, 2021, in 15 pages.
"An Introduction to the AutoStore System," AutoStore Concept Ver. 01.10a Commercial, dated 2004, in 36 pages.

(56) References Cited

OTHER PUBLICATIONS

Bräunl, "Embedded Robotics"—Mobile Robot Design and Applications with Embedded Systems, pp. 1-13 and 104, published 2006, in 14 pages.
Borenstein et al., "Where am I? Sensors and Methods for Mobile Robotic Positioning," University of Michigan, pp. 1-11 and 180-181, dated 1996, in 13 pages.
Gawrilow et al., "Dynamic Routing of Automated Guided Vehicles in Real-time," Technische Universität Berlin, Fakultät Mathematik und Naturwissenschaften, Institut für Mathematik, No. 039/2007, dated Oct. 10, 2007, in 16 pages.
Vivaldini et al., "Robotic Forklifts for Intelligent Warehouses: Routing, Path Planning, and Auto-localization," IEEE, dated 2010, in 6 pages.
Vivaldini et al., "Automatic Routing System for Intelligent Warehouses," IEEE, dated Feb. 28, 2010, in 6 pages.
Memorandum Order Denying Defendant's Partially Renewed Motion to Dismiss, *Ocado Innovation Ltd. and Ocado Solutions Ltd. vs. Autostore AS and Autostore Systems, Inc.*, Case No. 1:21-cv-00041-JL, filed Aug. 13, 2021, in 38 pages.
Defendant's Answer, Affirmative Defenses, and Counterclaims to Plaintiff's Second Amended Complaint, *Ocado Innovation Ltd. and Ocado Solutions Ltd. vs. Autostore AS and Autostore Systems, Inc.*, Case No. 1:21-cv-00041-JL, filed Aug. 27, 2021, in 49 pages.
Plaintiff's Answer to Defendant's Counterclaims, *Ocado Innovation Ltd. and Ocado Solutions Ltd. vs. Autostore AS and Autostore Systems, Inc.*, Case No. 1:21-cv-00041-JL, filed Oct. 1, 2021, in 9 pages.
Plaintiff's Motion to Strike Defendant's Affirmative Defense of Inequitable Conduct and Memorandum in Support of Motion, *Ocado Innovation Ltd. and Ocado Solutions Ltd. vs. Autostore AS and Autostore Systems, Inc.*, Case No. 1:21-cv-00041-JL, filed Oct. 1, 2021, in 48 pages.
Complaint for Patent Infringement with Exhibits, *Ocado Innovation Ltd. and Ocado Solutions Ltd. vs. Autostore AS and Autostore Systems, Inc.*, Case No. 1:21-cv-00806-JL, filed Oct. 6, 2021, in 438 pages.
Plaintiff's Reply Memorandum in Further Support of Motion to Strike Defendant's Affirmative Defense of Inequitable Conduct, *Ocado Innovation Ltd. and Ocado Solutions Ltd. vs. Autostore AS and Autostore Systems, Inc.*, Case No. 1:21-cv-00041-JL, filed Oct. 22, 2021, in 14 pages.
Corrected Order of Consolidation Consolidating Case No. 1:21-cv-00041-JL and 1:21-cv-00806-JL, *Ocado Innovation Ltd. and Ocado Solutions Ltd. vs. Autostore AS and Autostore Systems, Inc.*, filed Dec. 8, 2021, in 2 pages.
Defendant's Answer, Affirmative Defenses, and Counterclaims to Plaintiff's Complaint in Former Case No. 1:21-cv-00806-JL, *Ocado Innovation Ltd. and Ocado Solutions Ltd. vs. Autostore AS and Autostore Systems, Inc.*, Case No. 1:21-cv-00041-JL, filed Dec. 10, 2021, in 36 pages.
Memorandum Order Granting Plaintiff's Motion to Strike Defendant's Inequitable Conduct Defense, *Ocado Innovation Ltd. and Ocado Solutions Ltd. vs. Autostore AS and Autostore Systems, Inc.*, Case No. 1:21-cv-00041-JL, filed Dec. 30, 2021, in 13 pages.
Plaintiff's Answer to Defendant's Counterclaims in Former Case No. 1:21-cv-00806-JL, *Ocado Innovation Ltd. and Ocado Solutions Ltd. vs. Autostore AS and Autostore Systems, Inc.*, Case No. 1:21-cv-00041-JL, filed Dec. 31, 2021, in 6 pages.
Defendant's Opposition to Plaintiff's Motion to Strike, *Ocado Innovation Ltd. and Ocado Solutions Ltd. vs. Autostore AS and Autostore Systems, Inc.*, Case No. 1:21-cv-00041-JL, filed Jun. 7, 2022, in 19 pages.
Plaintiff's Reply Memorandum in Further Support of Motion to Strike Defendant's Untimely Proposed Claim Constructions, *Ocado Innovation Ltd. and Ocado Solutions Ltd. vs. Autostore AS and Autostore Systems, Inc.*, Case No. 1:21-cv-00041-JL, filed Jun. 13, 2022, in 6 pages.
Defendant's Sur-Reply in Opposition to Plaintiff's Motion to Strike, *Ocado Innovation Ltd. and Ocado Solutions Ltd. vs. Autostore AS and Autostore Systems, Inc.*, Case No. 1:21-cv-00041-JL, filed Jun. 14, 2022, in 9 pages.
Defendant's Motion to Partially Strike Plaintiff's First Supplemental Preliminary Infringement Contentions, *Ocado Innovation Ltd. and Ocado Solutions Ltd. vs. Autostore AS and Autostore Systems, Inc.*, Case No. 1:21-cv-00041-JL, filed Jun. 1, 2022, in 5 pages.
Plaintiff's Opposition to Defendant's Motion to Partially Strike Plaintiff's First Supplemental Preliminary Infringement Contentions, *Ocado Innovation Ltd. and Ocado Solutions Ltd. vs. Autostore AS and Autostore Systems, Inc.*, Case No. 1:21-cv-00041-JL, filed Jun. 7, 2022, in 12 pages.
Defendant's Reply in Support of Motion to Partially Strike Plaintiff's First Supplemental Preliminary Infringement Contentions, *Ocado Innovation Ltd. and Ocado Solutions Ltd. vs. Autostore AS and Autostore Systems, Inc.*, Case No. 1:21-cv-00041-JL, filed Jun. 10, 2022, in 9 pages.
Joint Claim Construction and Prehearing Statement, *Ocado Innovation Ltd. and Ocado Solutions Ltd. vs. Autostore AS and Autostore Systems, Inc.*, Case No. 1:21-cv-00041-JL, filed Jun. 3, 2022, in 80 pages.
Defendant's SPR 6.1(a) Disclosure of Claim Terms Proposed for Construction, *Ocado Innovation Ltd. and Ocado Solutions Ltd. vs. Autostore AS and Autostore Systems, Inc.*, Case No. 1:21-cv-00041-JL, dated Mar. 24, 2022, in 8 pages.
Plaintiff's Proposed Claim Constructions and Supporting Evidence, *Ocado Innovation Ltd. and Ocado Solutions Ltd. vs. Autostore AS and Autostore Systems, Inc.*, Case No. 1:21-cv-00041-JL, dated Apr. 21, 2022, in 28 pages.
Plaintiff's Supplemental Proposed Claim Constructions and Supporting Evidence, *Ocado Innovation Ltd. and Ocado Solutions Ltd. vs. Autostore AS and Autostore Systems, Inc.*, Case No. 1:21-cv-00041-JL, dated May 13, 2022, in 29 pages.
Declaration of Dr. Brian Pfeifer in Support of Plaintiff's Proposed Claim Constructions, *Ocado Innovation Ltd. and Ocado Solutions Ltd. vs. Autostore AS and Autostore Systems, Inc.*, Case No. 1:21-cv-00041- JL, dated May 27, 2022, in 35 pages.
Declaration of Dr. Petros Ioannou in Support of Defendant's Proposed Claim Constructions, *Ocado Innovation Ltd. and Ocado Solutions Ltd. vs. Autostore AS and Autostore Systems, Inc.*, Case No. 1:21-cv-00041-JL, dated May 27, 2022, in 78 pages.
Declaration of Dr. Raffaello D'Andrea in Support of Plaintiff's Proposed Claim Constructions, *Ocado Innovation Ltd. and Ocado Solutions Ltd. vs. Autostore AS and Autostore Systems, Inc.*, Case No. 1:21-cv-00041-JL, dated May 27, 2022, in 64 pages.
Declaration of Dr. Matthew Spenko in Support of Defendant's Proposed Claim Constructions, *Ocado Innovation Ltd. and Ocado Solutions Ltd. vs. Autostore AS and Autostore Systems, Inc.*, Case No. 1:21-cv-00041-JL, dated May 27, 2022, in 22 pages.
Plaintiff's Updated Supplemental Proposed Claim Constructions and Supporting Evidence, *Ocado Innovation Ltd. and Ocado Solutions Ltd. vs. Autostore AS and Autostore Systems, Inc.*, Case No. 1:21-cv-00041-JL, dated May 27, 2022, in 36 pages.
Rebuttal Declaration of Dr. Stephen Derby Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 38 pages.
Rebuttal Declaration of Dr. Petros Ioannou Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 135 pages.
Rebuttal Declaration of Dr. Brian Pfeifer Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 15 pages.
Rebuttal Declaration of Dr. Raffaello D'Andrea Regarding Claim Construction, *Ocado Innovation Ltd. and Ocado Solutions Ltd. vs. Autostore AS and Autostore Systems, Inc.*, Case No. 1:21-cv-00041-JL, dated Jun. 24, 2022, in 41 pages.
Rebuttal Declaration of Dr. Matthew Spenko Regarding Claim Construction, *Ocado Innovation Ltd. and Ocado Solutions Ltd. vs.*

(56) References Cited

OTHER PUBLICATIONS

*Autostore AS and Autostore Systems, Inc.*, Case No. 1:21-cv-00041-JL, dated Jun. 24, 2022, in 6 pages.
Plaintiff's Opening Claim Construction Brief, *Ocado Innovation Ltd. and Ocado Solutions Ltd. vs. Autostore AS and Autostore Systems, Inc.*, Case No. 1:21-cv-00041-JL, dated Aug. 1, 2022, in 69 pages.
Defendant's Opening Claim Construction Brief, *Ocado Innovation Ltd. and Ocado Solutions Ltd. vs. Autostore AS and Autostore Systems, Inc.*, Case No. 1:21-cv-00041-JL, dated Aug. 1, 2022, in 65 pages.
Amended Joint Claim Construction and Prehearing Statement, *Ocado Innovation Ltd. and Ocado Solutions Ltd. vs. Autostore AS and Autostore Systems, Inc.*, Case No. 1:21-cv-00041-JL, dated Aug. 5, 2022, in 51 pages.
Defendant's Reply Claim Construction Brief, *Ocado Innovation Ltd. and Ocado Solutions Ltd. vs. Autostore AS and Autostore Systems, Inc.*, Case No. 1:21-cv-00041-JL, dated Aug. 22, 2022, in 66 pages.
Plaintiff's Responsive Claim Construction Brief, *Ocado Innovation Ltd. and Ocado Solutions Ltd. vs. Autostore AS and Autostore Systems, Inc.*, Case No. 1:21-cv-00041-JL, dated Aug. 22, 2022, in 64 pages.
Transcript of Markman Hearing—Morning Session, *Ocado Innovation Ltd. and Ocado Solutions Ltd. vs. Autostore AS and Autostore Systems, Inc.*, Case No. 1:21-cv-00041-JL, dated Sep. 29, 2022, in 115 pages.
Transcript of Markman Hearing—Afternoon Session, *Ocado Innovation Ltd. and Ocado Solutions Ltd. vs. Autostore AS and Autostore Systems, Inc.*, Case No. 1:21-cv-00041-JL, dated Sep. 29, 2022, in 130 pages.
Assented-To Motion for Leave to File Supplemental Responses to Certain of the Court's Markman Hearing Questions and Plaintiff's Proposed Supplemental Responses, *Ocado Innovation Ltd. and Ocado Solutions Ltd. vs. Autostore AS and Autostore Systems, Inc.*, Case No. 1:21-cv-00041-JL, dated Oct. 12, 2022, in 25 pages.
Defendant's Response to Plaintiff's Supplemental Responses to Certain of the Court's Markman Hearing Questions, *Ocado Innovation Ltd. and Ocado Solutions Ltd. vs. Autostore AS and Autostore Systems, Inc.*, Case No. 1:21-cv-00041-JL, dated Oct. 20, 2022, in 31 pages.
Declaration of Boloori in Support of Defendant's Opposition to Plaintiff's Motion to Strike with Chart Summarizing Certain Plaintiff Statements in Claim Construction Briefing and Motion to Strike, *Ocado Innovation Ltd. and Ocado Solutions Ltd. vs. Autostore AS and Autostore Systems, Inc.*, Case No. 1:21-cv-00041-JL, dated Dec. 9, 2022, in 15 pages.
Plaintiff's Supplemental Claim Construction Brief, *Ocado Innovation Ltd. and Ocado Solutions Ltd. vs. Autostore AS and Autostore Systems, Inc.*, Case No. 1:21-cv-00041-JL, dated Jan. 5, 2023, in 6 pages.
Defendant's Supplemental Brief in Response to Plaintiff's Supplemental Claim Construction Brief, *Ocado Innovation Ltd. and Ocado Solutions Ltd. vs. Autostore AS and Autostore Systems, Inc.*, Case No. 1:21-cv-00041-JL, dated Jan. 10, 2023, in 9 pages.
Defendant's Notice of Supplemental Authority, *Ocado Innovation Ltd. and Ocado Solutions Ltd. vs. Autostore AS and Autostore Systems, Inc.*, Case No. 1:21-cv-00041-JL, dated Feb. 2, 2023, in 97 pages.
Petition for Inter Partes Review of U.S. Pat. No. 10,913,602, *Autostore System Inc. v. Ocado Innovation Limited*, Inter Partes Review No. IPR2022-00443, dated Jan. 14, 2022, in 97 pages.
Ex. 1003 Declaration of Dr. Stephen Derby, *Autostore System Inc. v. Ocado Innovation Limited*, Inter Partes Review No. IPR2022-00443, dated Jan. 14, 2022, in 95 pages.
Ex. 1007 Petition for Inter Partes Review of U.S. Pat. No. 10,474,140, *Autostore System Inc. v. Ocado Innovation Limited*, Inter Partes Review No. IPR2022-00443, dated Jan. 14, 2022, in 92 pages.
Ex. 1008 Corrected Declaration of Dr. Brian Pfeifer in Support of Petition for Inter Partes Review of U.S. Pat. No. 10,474,140, *Autostore System Inc. v. Ocado Innovation Limited*, Inter Partes Review No. IPR2022-00443, dated Jan. 14, 2022, in 126 pages.
Ex. 1012 Decision Denying Institution of Inter Partes Review of U.S. Pat. No. 10,494,239, *Autostore System Inc. v. Ocado Innovation Limited*, Inter Partes Review No. IPR2022-00443, filed Jan. 14, 2022, in 41 pages.
Ex. 1013 Decision Denying Institution of Post-Grant Review of U.S. Pat. No. 10,696,478, *Autostore System Inc. v. Ocado Innovation Limited*, Inter Partes Review No. IPR2022-00443, filed Jan. 14, 2022, in 36 pages.
Ex. 1014 Declaration of Dr. Bruno Lequesne, *Autostore System Inc. v. Ocado Innovation Limited*, Inter Partes Review No. IPR2022-00443, filed Jan. 14, 2022, in 21 pages.
Ex. 1015 Letter from Proceeding Relating to EP3050824, *Autostore System Inc. v. Ocado Innovation Limited*, Inter Partes Review No. IPR2022-00443, filed Jan. 14, 2022, in 10 pages.
Ex. 1016 Notice of Opposition to EP3050824, *Autostore System Inc. v. Ocado Innovation Limited*, Inter Partes Review No. IPR2022-00443, filed Jan. 14, 2022, in 50 pages.
Patent Owner Preliminary Response in Reply to Petition for Inter Partes Review of U.S. Pat. No. 10,913,602, *Autostore System Inc. v. Ocado Innovation Limited*, Inter Partes Review No. IPR2022-00443, dated Apr. 25, 2022, in 86 pages.
Ex. 2009 Patent Owner Preliminary Response in Reply to Petition for Inter Partes Review for U.S. Pat. No. 10,093,525, *Autostore System Inc. v. Ocado Innovation Limited*, Inter Partes Review No. IPR2022-00443, filed Apr. 25, 2022, in 80 pages.
Ex. 2010 Patent Owner Preliminary Response in Reply to Petition for Inter Partes Review for U.S. Pat. No. 10,494,239, *Autostore System Inc. v. Ocado Innovation Limited*, Inter Partes Review No. IPR2022-00443, filed Apr. 25, 2022, in 81 pages.
Ex. 2011 Patent Owner Preliminary Response in Reply to Petition for Post-Grant Review for U.S. Pat. No. 10,696,478, *Autostore System Inc. v. Ocado Innovation Limited*, Inter Partes Review No. IPR2022-00443, dated Apr. 25, 2022, in 83 pages.
Ex. 2012 ITC Final Initial Determination (public version) in Inv. No. 337-TA-1228, *Autostore System Inc. v. Ocado Innovation Limited*, Inter Partes Review No. IPR2022-00443, dated Apr. 25, 2022, in 180 pages (in 2 parts).
Ex. 2014 Reply to Notice of Opposition to EP3250481, *Autostore System Inc. v. Ocado Innovation Limited*, Inter Partes Review No. IPR2022-00443, dated Apr. 25, 2022, in 29 pages.
Ex. 2015 Notice of Opposition to EP3250481, *Autostore System Inc. v. Ocado Innovation Limited*, Inter Partes Review No. IPR2022-00443, dated Apr. 25, 2022, in 6 pages.
Ex. 2016 Reply to Notice of Opposition to EP3050824, *Autostore System Inc. v. Ocado Innovation Limited*, Inter Partes Review No. IPR2022-00443, dated Apr. 25, 2022, in 31 pages.
Ex. 2017 Notice of Opposition to EP3050824, *Autostore System Inc. v. Ocado Innovation Limited*, Inter Partes Review No. IPR2022-00443, dated Apr. 25, 2022, in 8 pages.
Ex. 2018 ITC Commission Opinion (public version) in Inv. No. 337-TA-1228, *Autostore System Inc. v. Ocado Innovation Limited*, Inter Partes Review No. IPR2022-00443, dated Apr. 25, 2022, in 27 pages.
Ex. 2020 Declaration of Dr. Brian Pfeifer in Support of Petition for Inter Partes Review of U.S. Pat. No. 10,913,602, *Autostore System Inc. v. Ocado Innovation Limited*, Inter Partes Review No. IPR2022-00443, dated Apr. 25, 2022, in 91 pages.
Decision Denying Institution of Inter Partes Review of U.S. Pat. No. 10,913,602, *Autostore System Inc. v. Ocado Innovation Limited*, Inter Partes Review No. IPR2022-00443, dated Jul. 20, 2022, in 26 pages.
Petition for Inter Partes Review of U.S. Pat. No. 10,961,051, *Autostore System Inc. v. Ocado Innovation Limited*, Inter Partes Review No. IPR2022-00673, dated Mar. 4, 2022, in 99 pages.
Ex. 1003 Declaration of Dr. Stephen Derby, *Autostore System Inc. v. Ocado Innovation Limited*, Inter Partes Review No. IPR2022-00673, dated Mar. 4, 2022, in 103 pages.
Patent Owner Preliminary Response in Reply to Petition for Inter Partes Review of U.S. Pat. No. 10,961,051, *Autostore System Inc. v. Ocado Innovation Limited*, Inter Partes Review No. IPR2022-00673, dated Jun. 16, 2022, in 70 pages.

(56) References Cited

OTHER PUBLICATIONS

Ex. 2001 Declaration of Dr. Brian Pfeifer, *Autostore System Inc. v. Ocado Innovation Limited*, Inter Partes Review No. IPR2022-00673, dated Jun. 16, 2022, in 67 pages.
Ex. 2012 Decision Denying Institution of Inter Partes Review of U.S. Pat. No. 10,093,525, *Autostore System Inc. v. Ocado Innovation Limited*, Inter Partes Review No. IPR2022-00673, dated Jun. 16, 2022, in 25 pages.
Decision Granting Institution of Inter Partes Review of U.S. Pat. No. 10,961,051, *Autostore System Inc. v. Ocado Innovation Limited*, Inter Partes Review No. IPR2022-00673, dated Sep. 14, 2022, in 40 pages.
Ex. 1016 Excerpts from Petition for Inter Partes Review of U.S. Pat. No. 10,093,525, *Autostore System Inc. v. Ocado Innovation Limited*, Inter Partes Review No. IPR2022-00673, dated Oct. 12, 2022, in 5 pages.
Ex. 1018 Declaration of Dr. Jason Janét, *Autostore System Inc. v. Ocado Innovation Limited*, Inter Partes Review No. IPR2022-00673, dated Oct. 12, 2022, in 105 pages.
Ex. 2015 Second Declaration of Dr. Brian Pfeifer, *Autostore System Inc. v. Ocado Innovation Limited*, Inter Partes Review No. IPR2022-00673, dated Jan. 23, 2023, in 84 pages.
Ex. 2016 Transcript of Deposition of Dr. Jason Janét, *Autostore System Inc. v. Ocado Innovation Limited*, Inter Partes Review No. IPR2022-00673, dated Jan. 23, 2023, in 207 pages.
Patent Owner Response, *Autostore System Inc. v. Ocado Innovation Limited*, Inter Partes Review No. IPR2022-00673, dated Jan. 23, 2023, in 71 pages.
Ex. 2025 Third Declaration of Dr. Brian Pfeifer in Support of Motion to Amend, *Autostore System Inc. v. Ocado Innovation Limited*, Inter Partes Review No. IPR2022-00673, dated Jan. 23, 2023, in 14 pages.
Patent Owner Non-Contingent Motion to Amend, *Autostore System Inc. v. Ocado Innovation Limited*, Inter Partes Review No. IPR2022-00673, dated Jan. 23, 2023, in 59 pages.
Patent Owner's Sur-Reply, *Autostore System Inc. v. Ocado Innovation Limited*, Inter Partes Review No. IPR2022-00673, dated Apr. 26, 2023, in 37 pages.
Ex. 2028 Transcript of Deposition of Dr. Jason Janét, *Autostore System Inc. v. Ocado Innovation Limited*, Inter Partes Review No. IPR2022-00673, dated Apr. 7, 2023, in 177 pages.
Ex. 2029 Declaration of Dr. Brian Pfeifer in Support of Motion to Amend, *Autostore System Inc. v. Ocado Innovation Limited*, Inter Partes Review No. IPR2022-00673, dated Apr. 26, 2023, in 13 pages.
Patent Owner's Reply in Support of Motion to Amend, *Autostore System Inc. v. Ocado Innovation Limited*, Inter Partes Review No. IPR2022-00673, dated Apr. 26, 2023, in 34 pages.
Patentee Grounds of Appeal in Appeal of Decision in Opposition to European Patent No. 3299316, dated Apr. 28, 2023, in 37 pages.

\* cited by examiner

APPARATUS FOR RETRIEVING UNITS FROM A STORAGE SYSTEM

CROSS REFERENCE TO RELATED APPLICATIONS

This application is a continuation patent application of U.S. patent application Ser. No. 16/902,459, filed Jun. 16, 2020, which is a divisional of U.S. patent application Ser. No. 15/905,360, filed Feb. 26, 2018, which is a continuation patent application of U.S. patent application Ser. No. 14/910,858, filed Feb. 8, 2016, now issued on Jun. 19, 2018 as U.S. Pat. No. 10,000,337, the entire content of each is incorporated herein by reference.

FIELD OF THE INVENTION

The present invention relates to apparatus for retrieving units form a storage system. In particular, but not exclusively, the invention relates to robotic devices for handling storage containers or bins in a store comprising a grid of stacked units.

BACKGROUND TO THE INVENTION

Some commercial and industrial activities require systems that enable the storage and retrieval of a large number of different products. One known system for the storage and retrieval of items in multiple product lines involves arranging storage bins or containers on rows of shelves arranged in aisles. Each bin or container holds a plurality of products of one product type. The aisles provide access between the rows of shelves, so that the required products can be retrieved by operatives or robots that circulate in the aisles. It will be appreciated, however, that the need to provide aisle space to access the products means that the storage density of such systems is relatively low. In other words, the amount of space actually used for the storage of products is relatively small compared to the amount of space required for the storage system as a whole.

In an alternative approach, which offers a significant improvement in storage density, containers are stacked on top of one another and the stacks are arranged in rows. The containers are accessed from above, removing the need for aisles between the rows and allowing more containers to be stored in a given space.

Methods of handling containers stacked in rows have been well known for decades. In some such systems, for example as described in U.S. Pat. No. 2,701,065, freestanding stacks of containers are arranged in rows in order to reduce the storage volume associated with storing such containers while still providing access to a specific container if required. Access to a given container is made possible by providing relatively complicated hoisting mechanisms which can be used to stack containers and to remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B (Cimcorp). Cimcorp discloses a mechanism for removing a plurality of stacked containers using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack). The load handler can be used to move containers between single-product stacks, for example to add a plurality of containers containing a single type of product to the store, and to pick up one or more containers from two or more single-product stacks to create a multi-product output stack. An example of this is the picking of vegetable crates in a central warehouse to create a multi-product order for delivery to retail stores.

In the system described in Cimcorp, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler. Furthermore, the system is not well adapted for the selection of a single container from a multi-product stack.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

Accordingly, for some applications, the use of multi-product stacks, in which the containers making up each stack may hold different products, is favoured in order to maximise the storage density of the system. The stored items must remain accessible reasonably quickly and easily, so that a plurality of different items required to fulfil a customer order can be picked from the storage system in an efficient way, even if some of the items required are stored in a lower level of a stack, underneath several other containers.

International patent application WO 98/049075A (Autostore), the contents of which are incorporated herein by reference, describes a system in which multi-product stacks of containers are arranged within a frame structure. A system of this type is illustrated schematically in FIGS. 1 to 4 of the accompanying drawings.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

The load handling devices 30 are further described in Norwegian patent number 317366, the contents of which are incorporated herein by reference. FIGS. 3(a) and 3(b) are schematic perspective views of a load handling device 30 from the rear and front, respectively, and FIG. 3(c) is a schematic front perspective view of a load handling device 30 lifting a bin 10.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 38 is lowered into engagement with the second set of rails 22b. The drive mechanism can then be used to drive the second set of wheels 36 to achieve movement in the Y direction.

The load handling device 30 is equipped with a crane device 40. The crane device 40 comprises a cantilever arm 42 that extends laterally from the top of the vehicle 32. A gripper plate 44 is suspended from the cantilever arm 42 by four cables 46. The cables 46 are connected to a winding mechanism (not shown) housed within the vehicle 32. The cables 46 can be spooled in or out from the cantilever arm 42, so that the position of the gripper plate 44 with respect to the vehicle 32 can be adjusted in the Z direction.

The gripper plate 44 is adapted to engage with the top of a bin 10. For example, the gripper plate 44 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 44, which is powered and controlled by signals carried through the cables 46 themselves or through a separate control cable (not shown).

To remove a bin 10 from the top of a stack 12, the load handling device 30 is moved as necessary in the X and Y directions so that the gripper plate 44 is positioned above the stack 12. The gripper plate 44 is then lowered vertically in the Z direction to engage with the bin 10 on the top of the stack 12, as shown in FIG. 3(c). The gripper plate 44 grips the bin 10, and is then pulled upwards on the cables 46, with the bin 10 attached. At the top of its vertical travel, the bin 10 is accommodated beneath the cantilever arm 42 and is held above the level of the rails 22. In this way, the load handling device 30 can be moved to a different position in the X-Y plane, carrying the bin 10 along with it, to transport the bin 10 to another location. The cables 46 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34, 36.

As shown in FIG. 4, a plurality of Identical load handling devices 30 are provided, so that each load handling device 30 can operate simultaneously to increase the throughput of the system. The system illustrated in FIG. 4 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it Is necessary to retrieve a bin 10 ("target bin") that is not located on the top of a stack 12, then the overlying bins 10 ("non-target bins") must first be moved to allow access to the target bin 10.

Each of the load handling devices 30 is under the control of a central computer. Each individual bin 10 in the system is tracked, so that the appropriate bins 10 can be retrieved, transported and replaced as necessary.

The system described with reference to FIGS. 1 to 4 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

For high-volume systems in which speed of operation is critical, it is important to maximise the performance of each of the load handing devices, in terms of speed of operation, battery life, reliability, lifting capacity, stability and so on. It may therefore be desirable to provide load-handling devices that offer improved performance in one or more of these areas.

It may also be desirable to increase the number of load handling devices in use at any one time, to allow an increase in the speed with which items can be retrieved from the storage system. For example, the Applicant's co-pending International Patent Application No. PCT/GB2013/051215, the content of which is incorporated herein by reference, describes a storage system in which a plurality of each of two different types of load handling device are provided. One type of load handling device is adapted to lift a plurality of bins from a stack in one operation, to allow a target bin in the stack to be accessed by a single-bin load handling device of the second type. In such cases, it may be desirable to reduce the size of the load handling devices in order to minimise instances in which the optimum movement path for one device is hindered by the presence of other devices.

It is against this background that the present invention has been devised.

SUMMARY OF THE INVENTION

From one aspect, the present invention concerns load handling devices for use in storage systems comprising a grid frame containing a plurality of stacks of containers. The load handling devices are arranged above the stacks of containers and are capable of lifting a container from a stack and moving the container laterally to another location. Advantageously, each load handling device occupies substantially only a single grid space in the storage system.

Accordingly, the present invention provides a load handling device for lifting and moving containers stacked in a storage system comprising a plurality of rails or tracks arranged in a grid pattern above the stacks of containers, the grid pattern comprising a plurality of grid spaces and each stack being located within a footprint of substantially only a single grid space, the load handling device being configured to move laterally on the rails or tracks above the stacks, and the load-handling device comprising: a container-receiving space located above the rails or tracks in use and a lifting device arranged to lift a container from a stack into the container-receiving space; wherein the load handling device has a footprint that, in use, occupies substantially only a single grid space in the storage system.

A load handling device according to an embodiment of the invention includes a container-receiving space into which a container can be lifted. The container-receiving space is arranged beneath a vehicle module, in which components such as power components, control components, drive components and lifting components are housed.

In preferred embodiments of the invention, the load handling device has an external housing that substantially encloses the container-receiving space. The external housing preferably has the shape of a cuboid.

By arranging the bulky components of the load handling device above the container-receiving space, the footprint of the load handling device is reduced compared to the cantilever designs shown in FIGS. 3(a) to 3(c) and described in NO317366, in which the bulky components are housed in a vehicle module disposed to one side of the container-receiving space. Advantageously, the load handling device of the invention occupies the space above only one stack of containers in the frame, in contrast to the cantilever design shown in FIGS. 3(a) to 3(c) which occupies the space above two stacks. This means that, by virtue of the invention, the efficiency of operation of the storage system can be improved, because the reduced footprint allows more load handling devices to be accommodated and reduces the likelihood of one device obstructing the optimum path of another.

The load handling device preferably includes a set of wheels for supporting the load handling device above the stacks. For example, lateral movement of the load handling device may be guided by rails disposed above the frame. The rails may be arranged in a grid pattern, allowing two-dimensional movement of the load handling device in the horizontal plane. The wheels may engage with the rails. Two sets of wheels may be provided, with one set being arranged to engage with a first set of rails to guide movement of the load handling device in a first direction, and another set being arranged to engage with a second set of rails to guide movement of the load handling device in a second direction.

In an embodiment of the invention, the wheels are arranged at the periphery of the container-receiving space. The wheels may be driven by one or more motors housed in the vehicle module. Drive may be transferred from the motors in the vehicle module to the wheels by drive transfer means disposed around the container-receiving space. For example, the drive transfer means may comprise a suitable arrangement of pulleys and drive belts.

Alternatively, the wheels may include integrated motors, for example motors integrated within the wheel hubs. In this way, each wheel is a self-container drive unit, and drive belts are not required. This arrangement is advantageous as it reduces the size of the load-handling device and facilitates servicing.

One or both sets of wheels may be configured to be raised and lowered with respect to the other set of wheels. One or more wheel lift motors or other wheel lift devices may be housed in the vehicle module for this purpose.

The vehicle module may house a winch or crane device for lifting the container into the container-receiving space. The crane device may include one or more motors for lifting the container, and the or each motor of the crane device may be housed in the vehicle module.

The crane device may include a gripper device configured to grip a container from above. The gripper device may be suspended from cables that can be extended and retracted from the vehicle to move the gripper device vertically.

In another embodiment, the load handling device is equipped with a lifting device arranged to lift a single container from the stack into the container-receiving space. The lifting device may comprise a pair of lifting arms arranged on either side of the container-receiving space, in which case the lifting device may comprise a gripper device mounted between the ends of the arms and arranged to grip a container from above.

The load-handling device preferably has a centre of mass that is located substantially directly above the gripper device when the gripper device is lowered below the container-receiving space.

In another embodiment, the lifting device comprises rods or cables arranged to engage with vertical channels formed in the side walls of the containers. The channels may be accessed by apertures in a top face of each container. In such an arrangement, vertically-extending spaces in the storage system are not necessary.

The rods or cables may carry an anchor mechanism arranged to engage releasably with a container. For example, the anchor mechanism may comprise one or more laterally-extendable arms for engaging a surface of the container. The anchor mechanism may be operated remotely, for example by a wire that extends through a tubular bore of the rod or cable.

A load handling device according to another embodiment of the invention comprises an upper part, a lower part including a container-receiving space, and winch means for lifting a container into the container-receiving space. The winch means preferably comprises a winch motor which is housed in the upper part, above the container-receiving space. The lower part preferably includes a wheel assembly to facilitate lateral movement of the load handling device with respect to the frame, and the upper part also includes at least one motor for driving one or more wheels of the wheel assembly.

The lower part may comprise a frame structure for supporting the wheels of the wheel assembly. The frame structure may be arranged around the container-receiving space. For example, the container-receiving space may be bounded on four sides by the frame structure. One or more elements of the frame structure may be moveable to raise and lower a first set of the wheels with respect to a second set of the wheels, thereby to facilitate engagement of either the first set of wheels or the second set of wheels with a first or a second set of rails or tracks, respectively. The moveable elements of the frame structure may be driven by a motor housed in the upper part of the load handling device.

The load-handling device of the invention is preferably a self-propelled robot vehicle.

From another aspect, the invention resides in a storage system comprising a frame containing a plurality of stacks of containers, and one or more load handling devices as described above. Each load handling device occupies substantially a single grid space, corresponding to the area occupied by only one stack of containers.

Accordingly, the present invention provides a storage system comprising: a first set of parallel rails or tracks and a second set of parallel rails or tracks extending transverse to the first set in a substantially horizontal plane to form a grid pattern comprising a plurality of grid spaces; a plurality of stacks of containers located beneath the rails, and arranged such that each stack occupies a footprint of substantially a single grid space; a load handling device as described above and arranged to move laterally above the stacks on the rails, the load handling device comprising a container-receiving space located above the rails and a lifting device arranged to lift a single container from a stack into the container-receiving space; wherein the load handling device has a footprint that occupies substantially only a single grid space in the storage systems.

In another aspect, the invention comprises a storage system comprising a frame containing a plurality of stacks of containers, a first handling device capable of lifting a plurality of containers from a stack in a single operation, and a second handling device capable of lifting a single container and moving the container laterally. The first and second handling devices are disposed above the frame and are independently moveable to access different stacks. The second handling device is of the type described above, and occupies a space corresponding substantially to only one stack of containers.

In this aspect, the provision of a first handling device capable of lifting a plurality of containers from a stack in a single operation along with a second handling device capable of lifting a single container and moving the container laterally provides an optimum solution when seeking to retrieve a container which is located in the middle or bottom of a stack. In such a case, only two lifting operations need be carried out to retrieve the target container, which greatly Increases the speed and efficiency of the retrieval process compared to prior art arrangements in which only one container can be lifted at a time.

The storage system may further comprise one or more port locations at which containers can be removed from and/or added to the storage system. The load handling device of the invention may be capable of transporting a target container from a stack to a port location. The containers may comprise open-topped bins. The containers may be arranged to interlock or engage with one another in the vertical direction when formed in a stack.

In a typical application, multiple handling devices may be employed so that multiple containers can be lifted and moved simultaneously. The handling devices may be of different types, and may be selected to balance the cost and energy consumption of the system with the speed and flexibility of operation. One benefit of the present invention is that, because the load handling devices occupy the space above only one stack, the efficiency of a multiple-device system can be improved compared to prior art load handling device designs which occupy two or more stack spaces. The gain in efficiency may arise from being able to accommodate more load handling devices in a given system, from optimising the routing of the device using the space gained by the reduced device footprints, or from a combination of these factors.

Preferred and/or optional features of each aspect of the invention may be used, alone or in appropriate combination in the other aspects of the invention also.

BRIEF DESCRIPTION OF THE DRAWINGS

Embodiments of the present invention will now be described, by way of example only, with reference to the remainder of the accompanying drawings, in which like reference numerals are used for like features, and in which.

DETAILED DESCRIPTION OF EMBODIMENTS OF THE INVENTION

Figure 1:
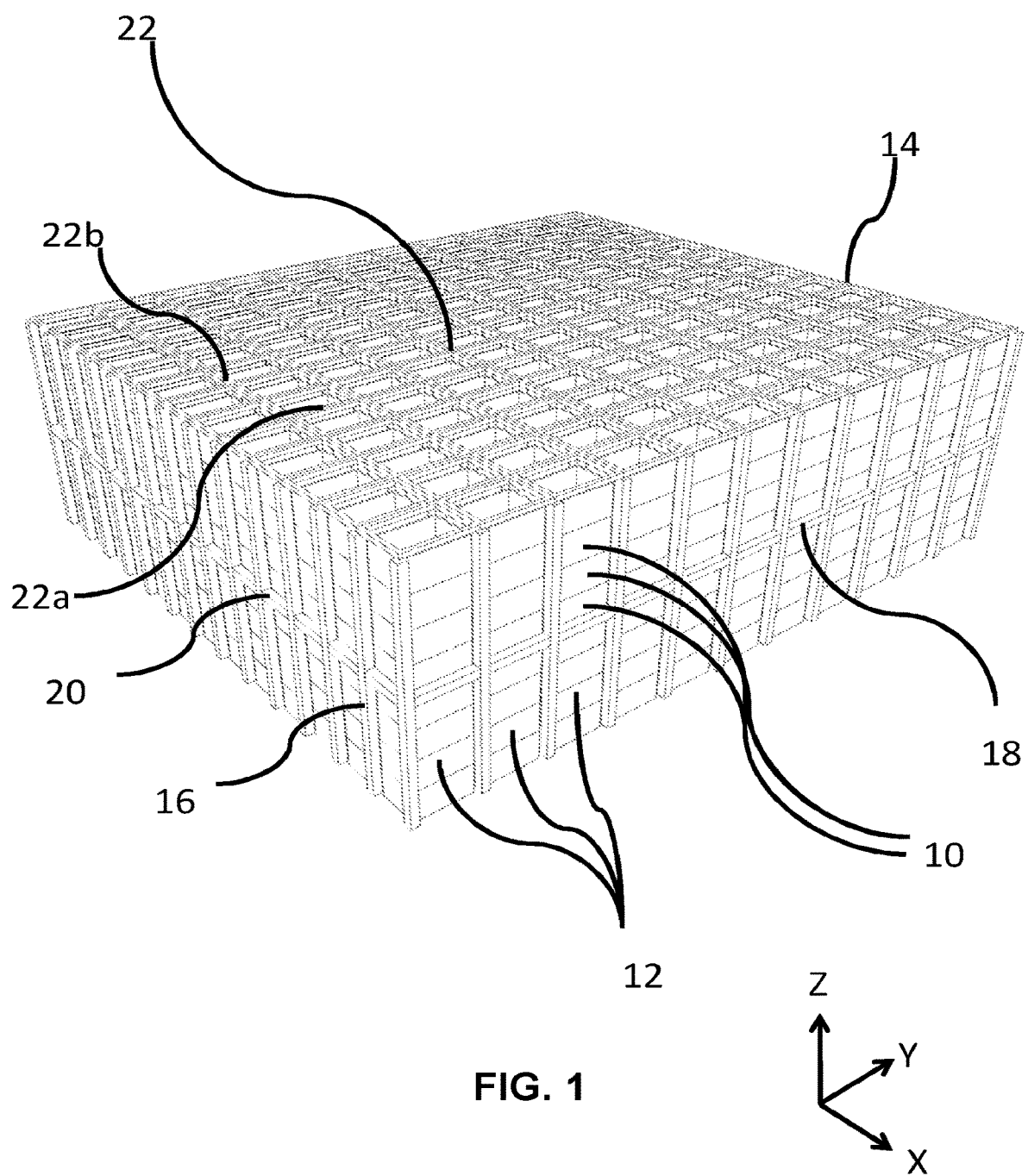
FIG. 1 is a schematic perspective view of a frame structure for housing a plurality of stacks of bins in a known storage system.
Figure 2:
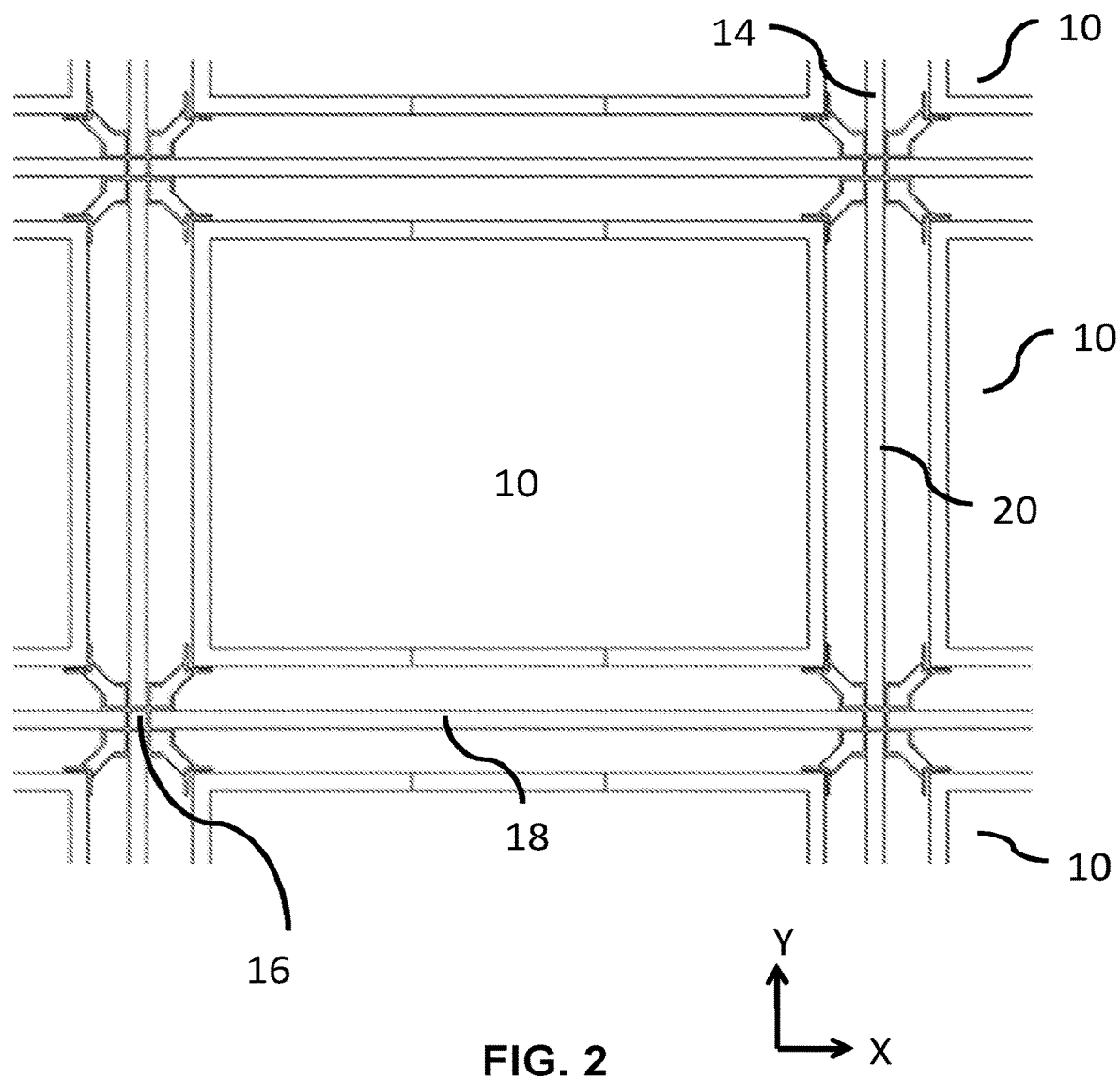
FIG. 2 is a schematic plan view of part of the frame structure of FIG. 1.
Figure 5:
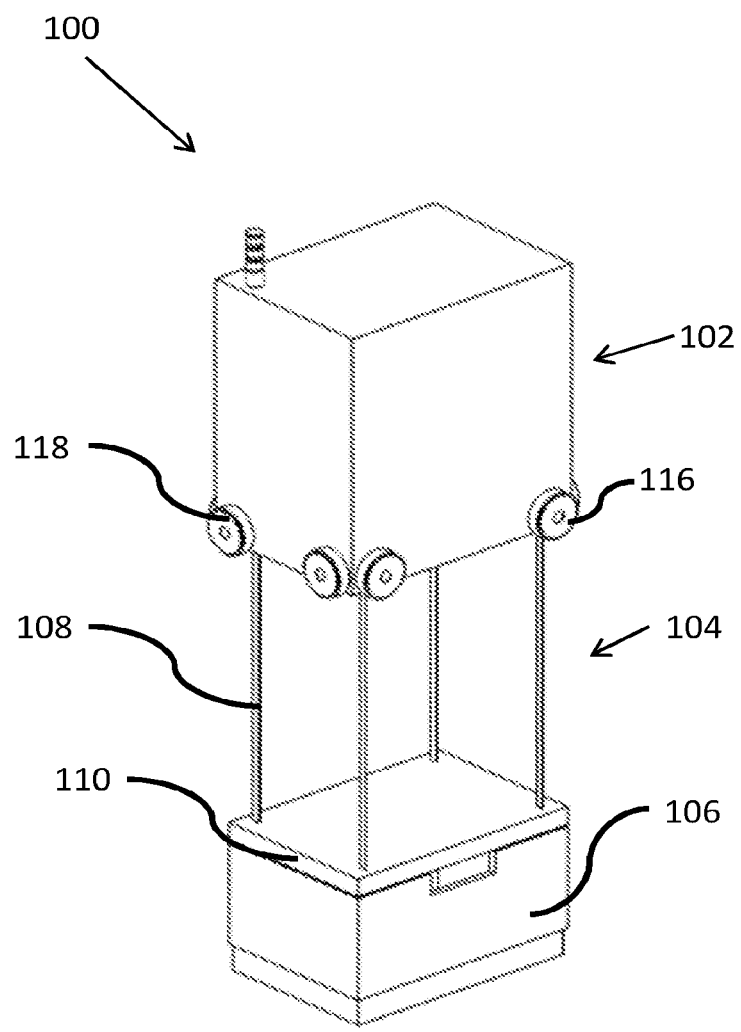
FIG. 5 is a schematic perspective view of a load handling device according to an embodiment of the invention.

FIG. 5 shows a load handling device 100 according to an embodiment of the Invention. The load handling device 100 comprises a vehicle 102 equipped with a winch or crane mechanism 104 to lift a storage container or bin 106, also known as a tote, from above. The crane mechanism 104 includes winch cables 108 and a grabber plate 110. The grabber plate 110 is configured to grip the top of the container 106 to lift it from a stack of containers 106 in a storage system of the type shown in FIGS. 1 and 2.

Figures 6A, 6B:
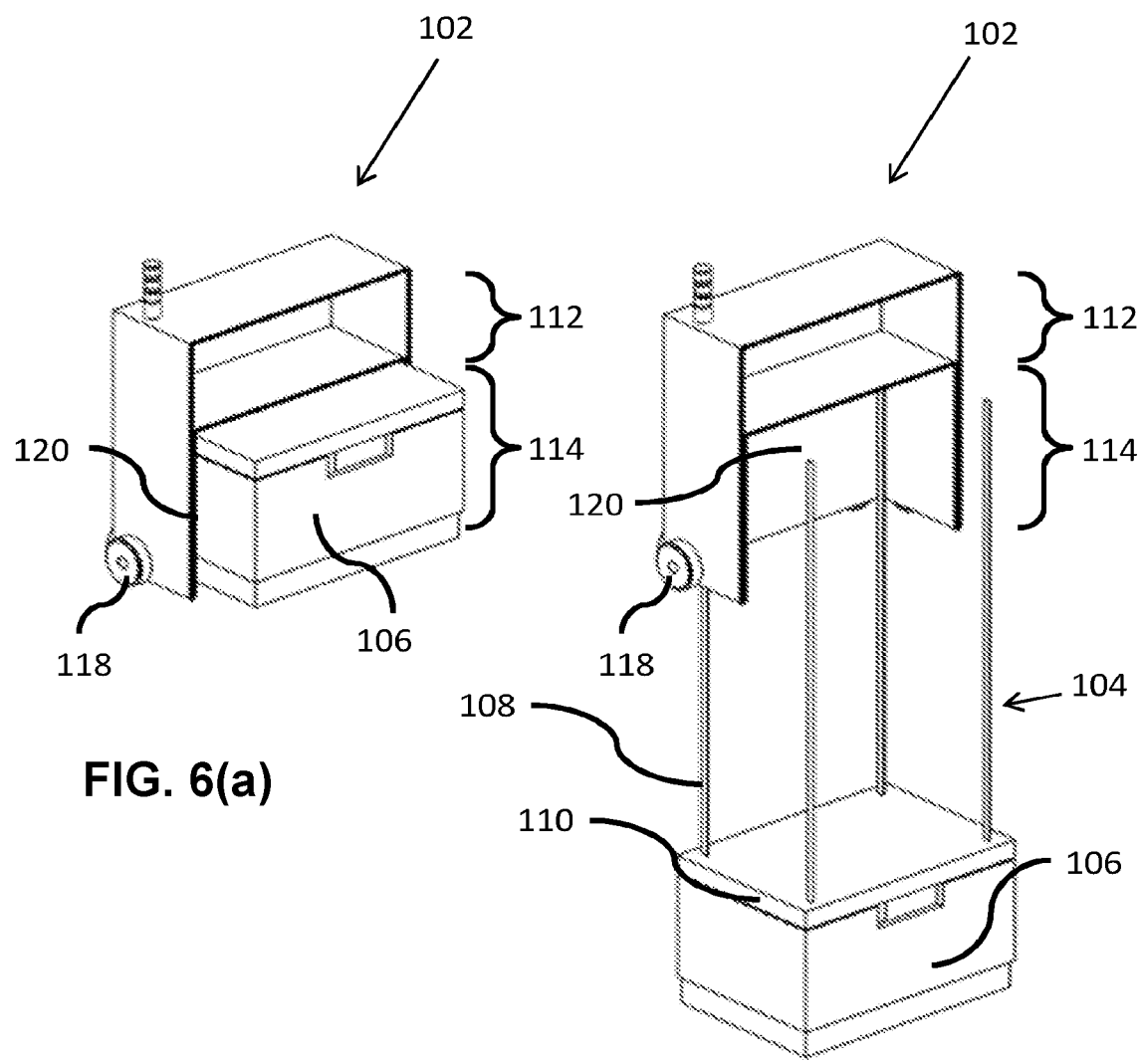
FIGS. 6(a) and 6(b) are schematic perspective views of the load handling device of FIG. 5 with part of the load handling device being cut-away in FIGS. 6(a) and 6(b) to show the inside of the device.

Referring also to FIGS. 6(a) and 6(b), the vehicle 102 comprises an upper part 112 and a lower part 114.

The lower part 114 is fitted with two sets of wheels 116, 118, which run on rails provided at the top of the frame of the storage system. At least one wheel of each set 116, 118 is driven to enable movement of the vehicle 102 in X- and Y-directions respectively along the rails. As will be explained below, one or both sets of wheels 116, 118 can be moved vertically to lift each set of wheels clear of the respective rails, thereby allowing the vehicle 102 to move in the desired direction.

The wheels 116, 118 are arranged around the periphery of a cavity or recess 120, known as a container-receiving recess, in the lower part 114. The recess 120 is sized to accommodate the bin 106 when it is lifted by the crane mechanism 104, as shown in FIG. 6(a). When in the recess 120, the bin 106 is lifted clear of the rails beneath, so that the vehicle 102 can move laterally to a different location. On reaching the target location, for example another stack, an access point in the storage system or a conveyor belt, the bin 106 can be lowered from the recess 120 (as shown in FIG. 6(b)) and released from the grabber plate 110.

Figure 6C:
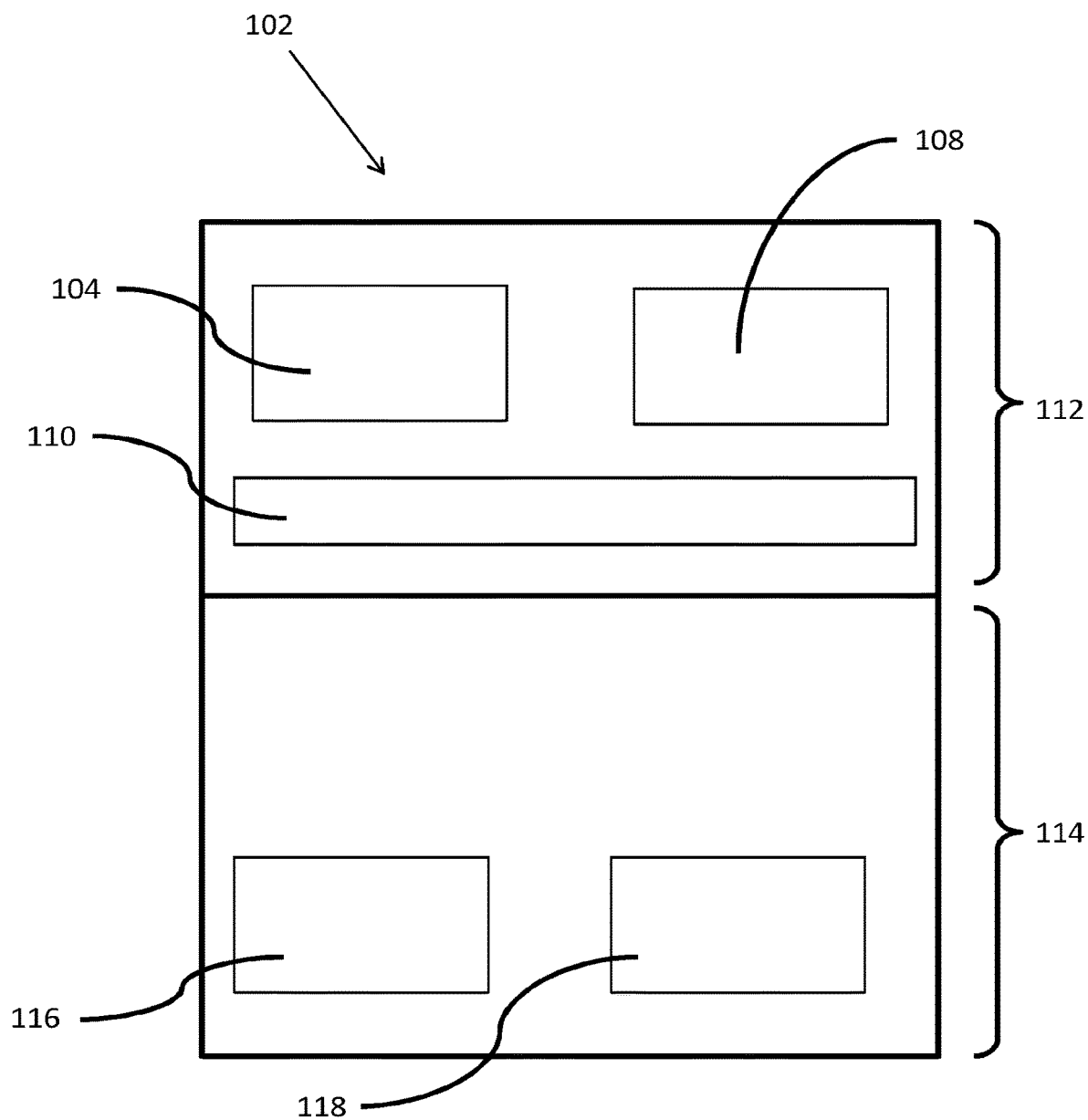
FIG. 6(c) shows one possible system architecture of the device.

The upper part 112 of the vehicle 102 houses all of the significant bulky components of the load handling device, as shown in FIG. 6(c). The upper part 112 houses the battery and associated electronics, controllers and communications devices, motors for driving the wheels 116, 118, motors for driving the crane mechanism 104, and other sensors and systems.

Figure 3A:
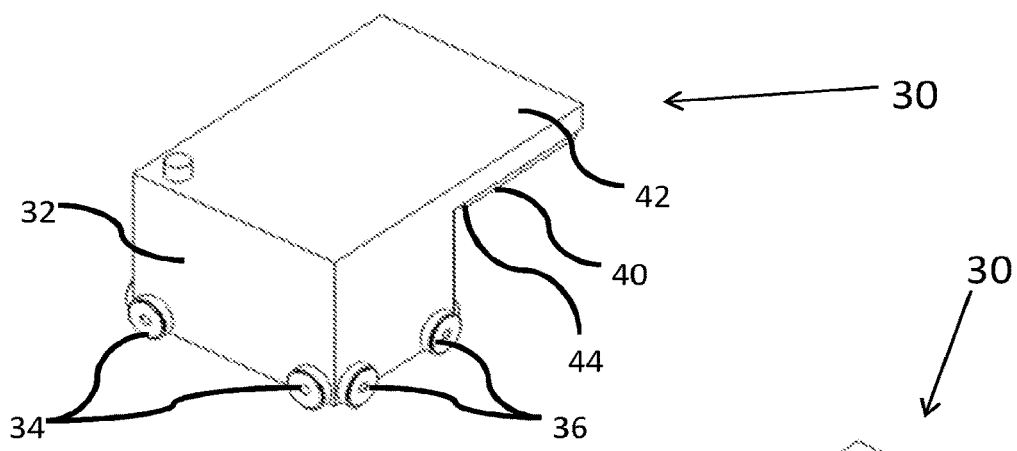
FIGS. 3(a) and 3(b) are schematic perspective views, from the rear and front respectively, of a known load handling device for use with the frame structure of FIGS. 1 and 2.
Figure 3B:
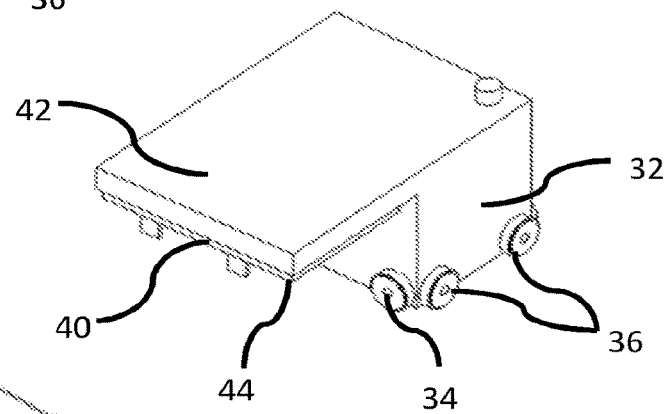
Figure 3C:
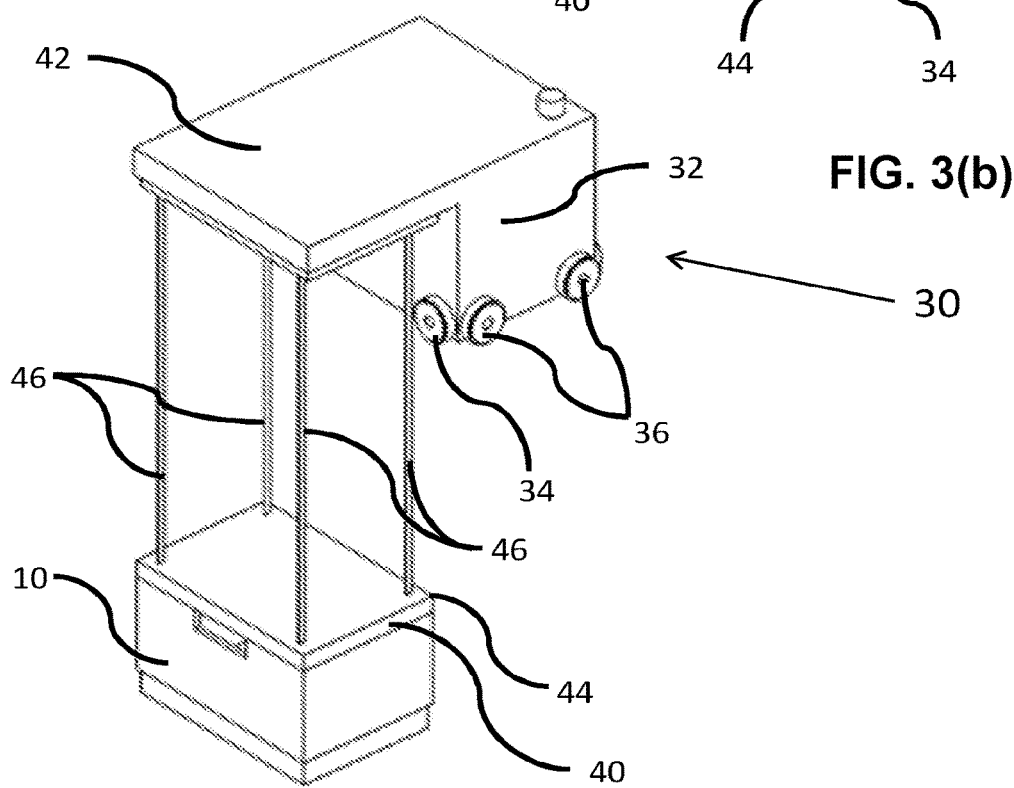
FIG. 3(c) is a schematic perspective view of the known load handling device in use lifting a bin.
Figure 4:
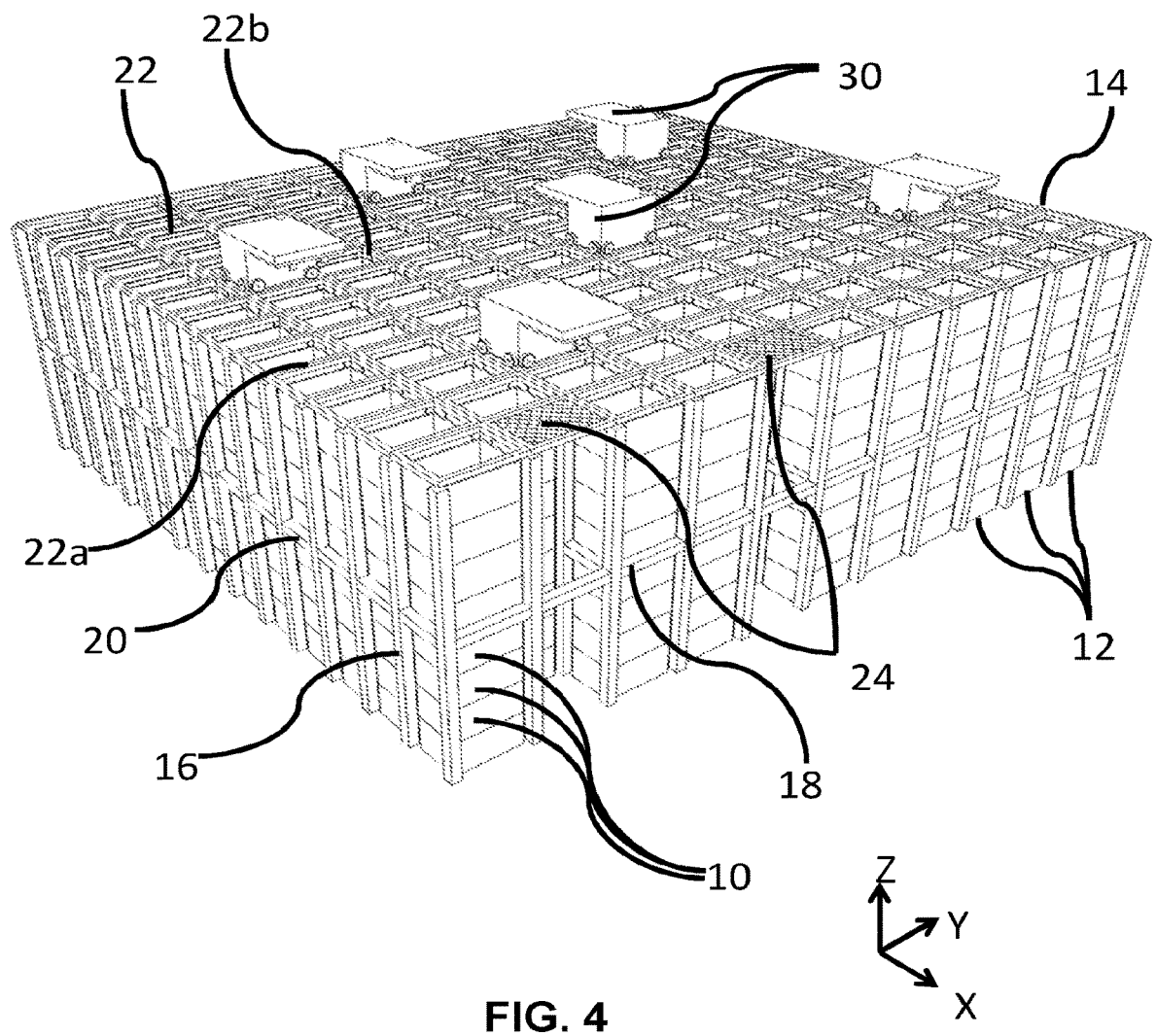
FIG. 4 is a schematic perspective view of a known storage system comprising a plurality of load handling devices of the type shown in FIGS. 3(a), 3(b) and 3(c), installed on the frame structure of FIGS. 1 and 2.
Figure 7:
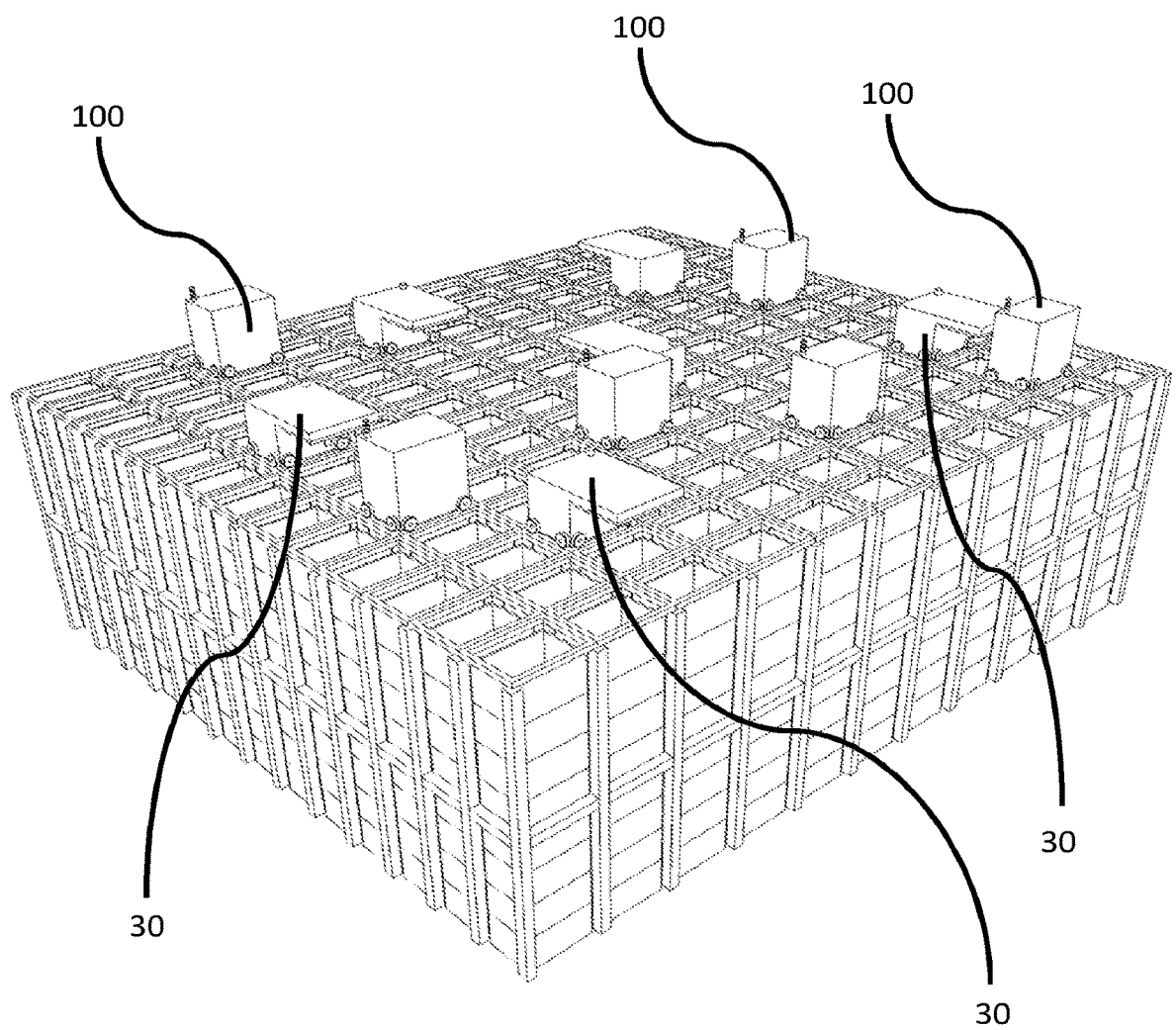
FIG. 7 is a schematic perspective view of a storage system comprising a plurality of known load handler devices of the type shown in FIGS. 3(a), 3(b) and 3(c) and a plurality of load handler devices of the type shown in FIG. 5, installed on the frame structure of FIGS. 1 and 2.

In this way, the footprint of the vehicle 102 is larger than the size of a bin 106 only enough to accommodate the wheels 116, 118 either side of the recess 120. In other words, the vehicle 102 occupies a single grid space in the storage system. In this way, the vehicle 102 therefore takes up the minimum possible amount of space in the X-Y plane, and has a footprint approximately half that of the prior art cantilever design shown in FIG. 3. For comparison, FIG. 7 shows load handling devices 100 according to the invention in use in a storage system of the type shown in FIGS. 1 and 2, alongside prior art cantilever-type load handling devices 30 of the type shown in FIG. 3. It can be seen that the prior art devices 30, although less tall, occupy two stack spaces compared to the taller but smaller-footprint devices 100 of the invention.

The load handling devices 100 of the invention can also offer Improved stability, increased load handling capacity and reduced weight compared to the cantilever-type prior art load handling devices 30, because in the invention the load of the containers is suspended between the pairs of wheels on each side of the vehicle. In contrast, the prior-art devices 30 must have a relatively heavy vehicle module to counterbalance the load in the cantilever configuration.

FIGS. 8 to 12 show one embodiment of the invention. The upper part 112 of the vehicle 102 houses three main motors: a Z-drive motor 150 used to raise and lower the winch cables 108, which are wound onto spools 109 mounted on drive shafts situated at opposite sides of the vehicle 102; an X-drive motor 152 which drives the first set of wheels 116, and a Y-drive motor 154 which drives the second set of wheels 118. The upper part 112 of the vehicle also houses a battery 156 to power the motors, and controllers, sensors and other components as described above with reference to FIG. 6(c).

Drive is transferred from the X- and Y-drive motors 152, 154 to the respective sets of wheels 116, 118 by means of belt drive mechanisms. The X-drive motor 152 drives a pulley 160 connected to a short drive shaft 162 that extends across the vehicle body. Drive is transferred from the short drive shaft 162 to each wheel in the first set of wheels 116 by an X drive belt 164. The Y-drive motor 154 drives a pulley 170 connected to a long drive shaft 172 that extends across the vehicle body in a direction perpendicular to the short drive shaft 162. Drive is transferred from the long drive shaft 172 to each wheel in the second set of wheels 118 by a Y drive belt 174.

The belt-driven wheels 116, 118 are mounted at the bottom of the lower part 114 of the vehicle 102. The use of drive belts 164, 174 to transfer drive from the motors to the wheels enables the motors 152, 154 to be mounted in the upper part 112 of the vehicle.

Figure 9:
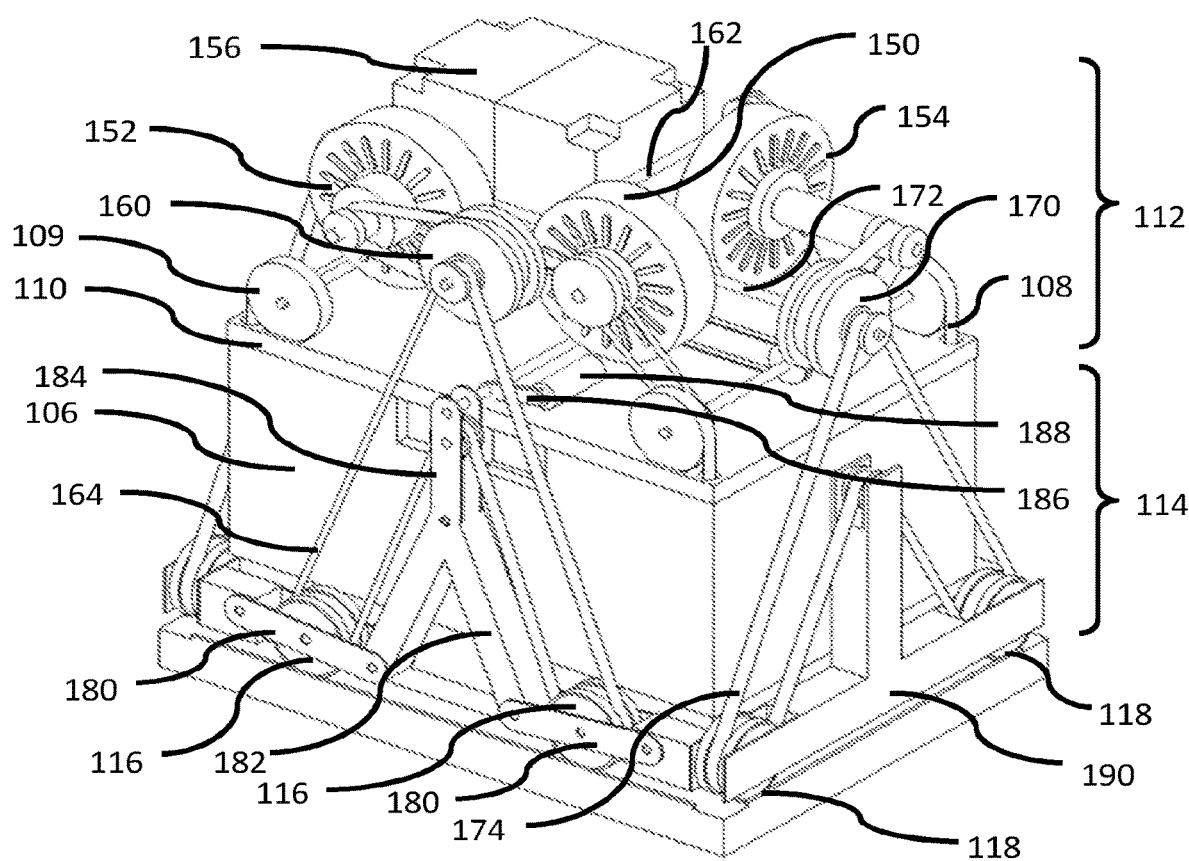
Figure 10:
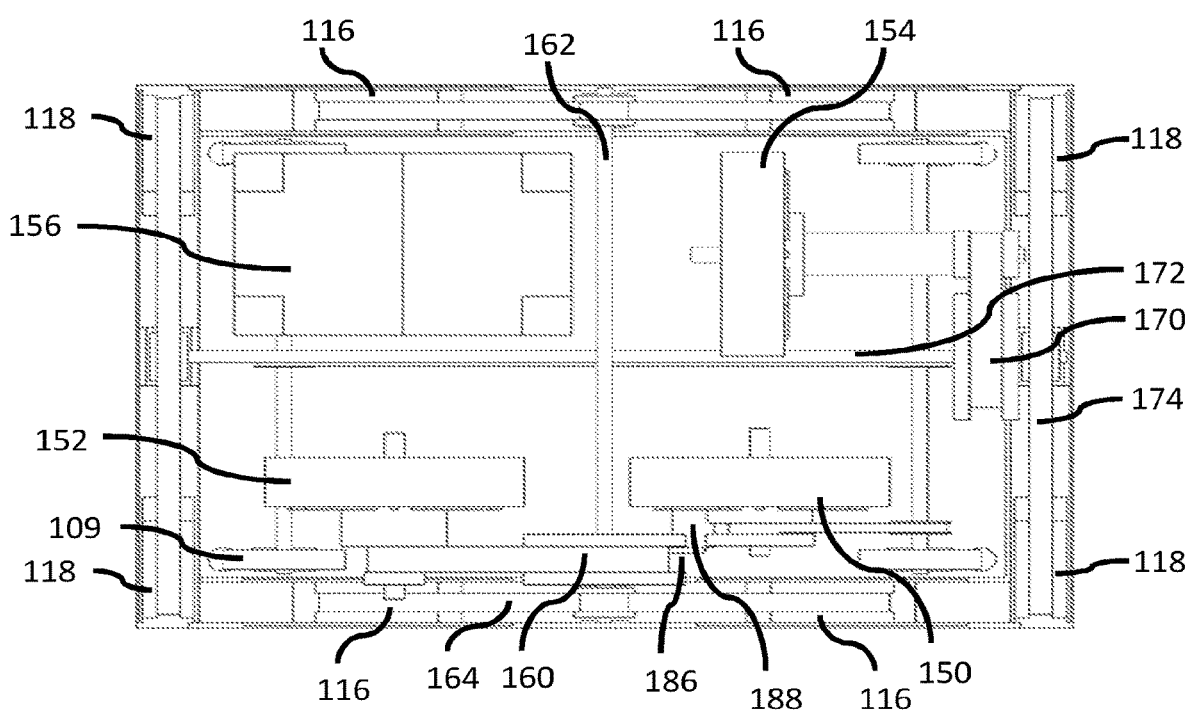
Figure 11:
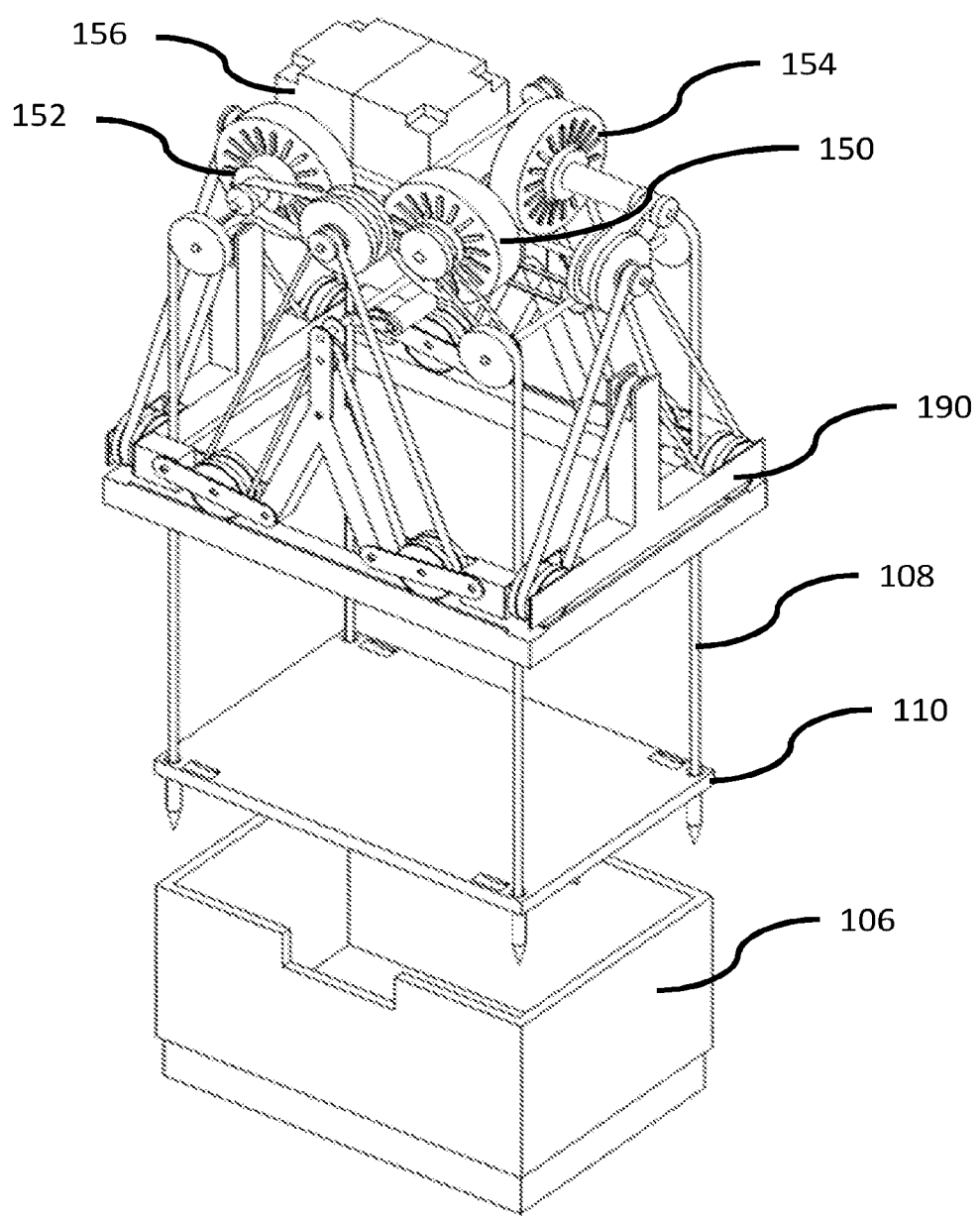
FIG. 11 is a schematic perspective view of the load handling device of FIGS. 8 to 10 with the outer casing omitted.
Figure 12:
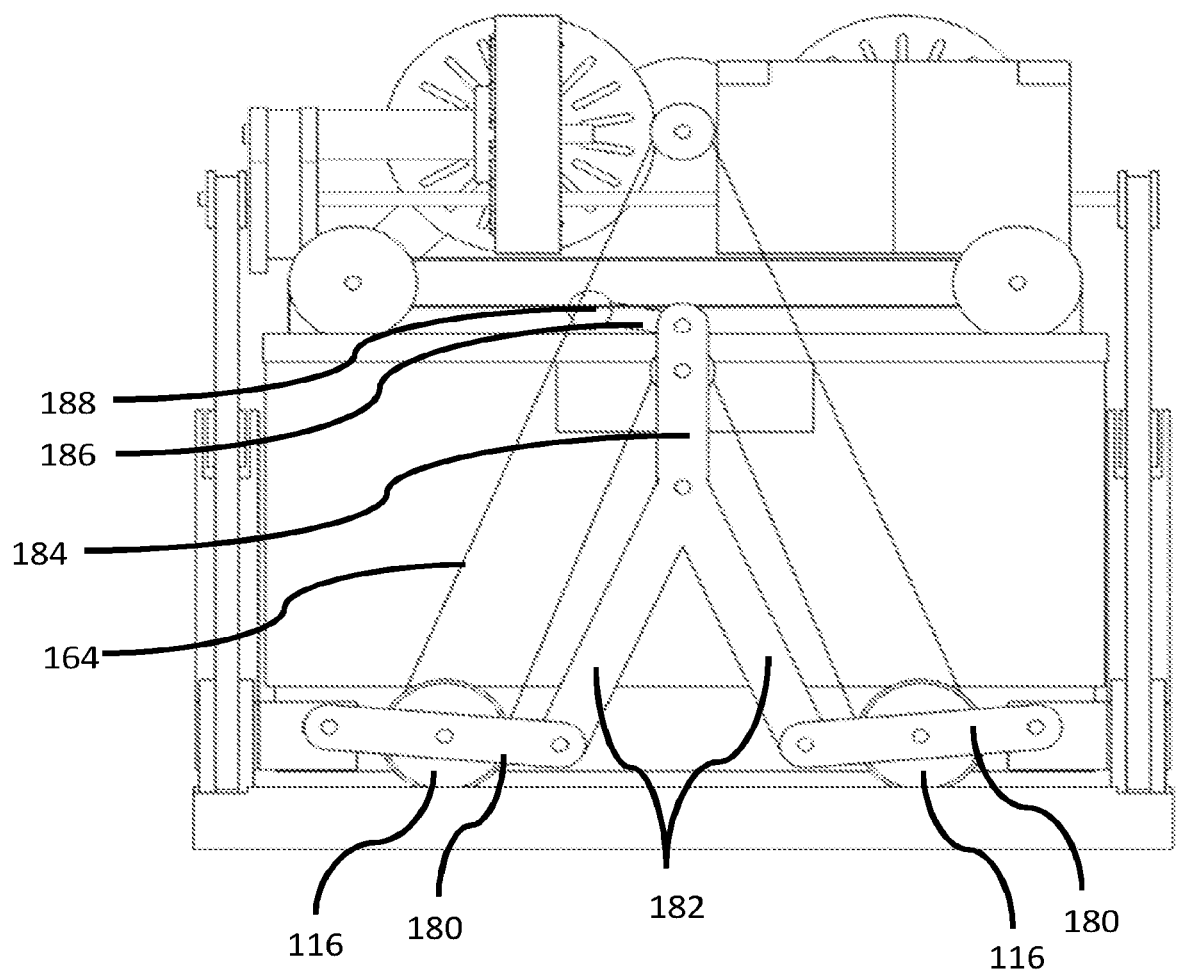
FIG. 12 is a side view of the load handling device of FIGS. 8 to 11.

In this embodiment, the first set of wheels 116 can be raised clear of the rails or lowered onto the rails by means of a wheel positioning mechanism, as shown most clearly in FIGS. 9, 11 and 12. Each wheel 116 is mounted on an arm 180 that is pivotally mounted at its outer end. An inner end of each arm 180 is connected to the lower end of a respective linkage 182. The upper ends of both linkages 182 are connected to the lower end of a common linkage 184. In turn, the upper end of the common linkage 184 is connected to a lever arm 186 that is moved by a motor 188. By operating the motor 188 to draw the common linkage 184 upwards, the first set of wheels 116 can be raised so that the second set of wheels 118 alone is engaged with the rails, allowing movement of the vehicle 102 in the Y-direction. By operating the motor 188 to push the common linkage 184 downwards, the first set of wheels 116 move downwards to engage with the rails and to lift the vehicle so that the second set of wheels 118 is lifted clear of the rails, as shown in FIGS. 9, 11 and 12. The vehicle 102 can then move in the X-direction.

The wheels 118 of the second set are mounted to fixed T-pieces 190 disposed at either end of the lower part 114 of the vehicle 102.

Figure 8:
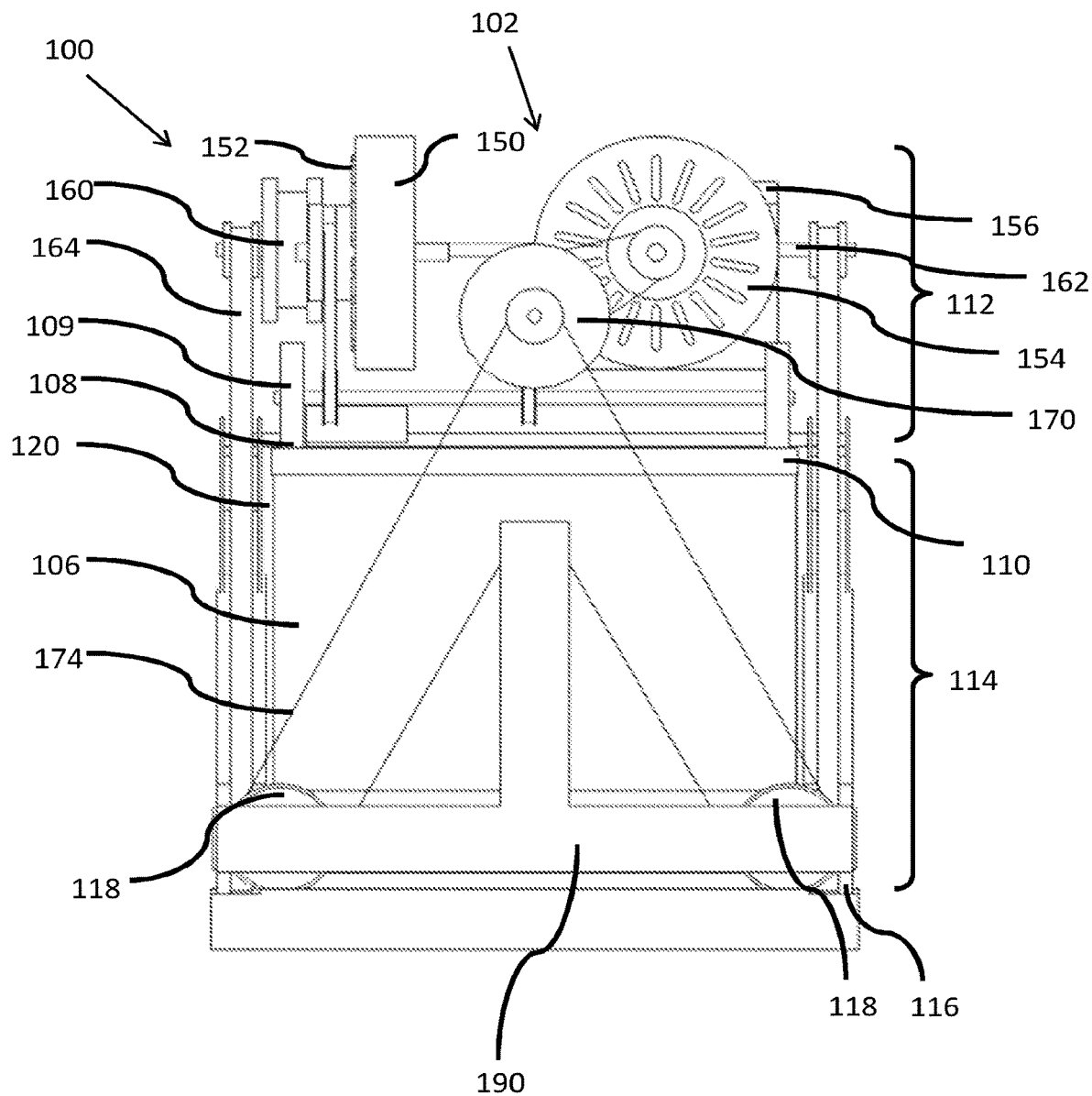
FIGS. 8, 9 and 10 are schematic side, perspective and top views of a load handling device according to another embodiment of the invention and with the outer casing omitted.

FIGS. 8, 9 and 12 show the load handling device 100 with a bin 106 lifted into the recess 120. FIG. 11 shows the load handling device 100 with the bin 106 beneath the device 100 and the grabber plate 110 about to engage with the bin 106. The wheels 116, 118 and the associated support pieces, linkages and drive belts 164, 174 are arranged around the edges of the recess 120, so that the upper part 112 of the vehicle 102 is solidly supported.

Figure 13:
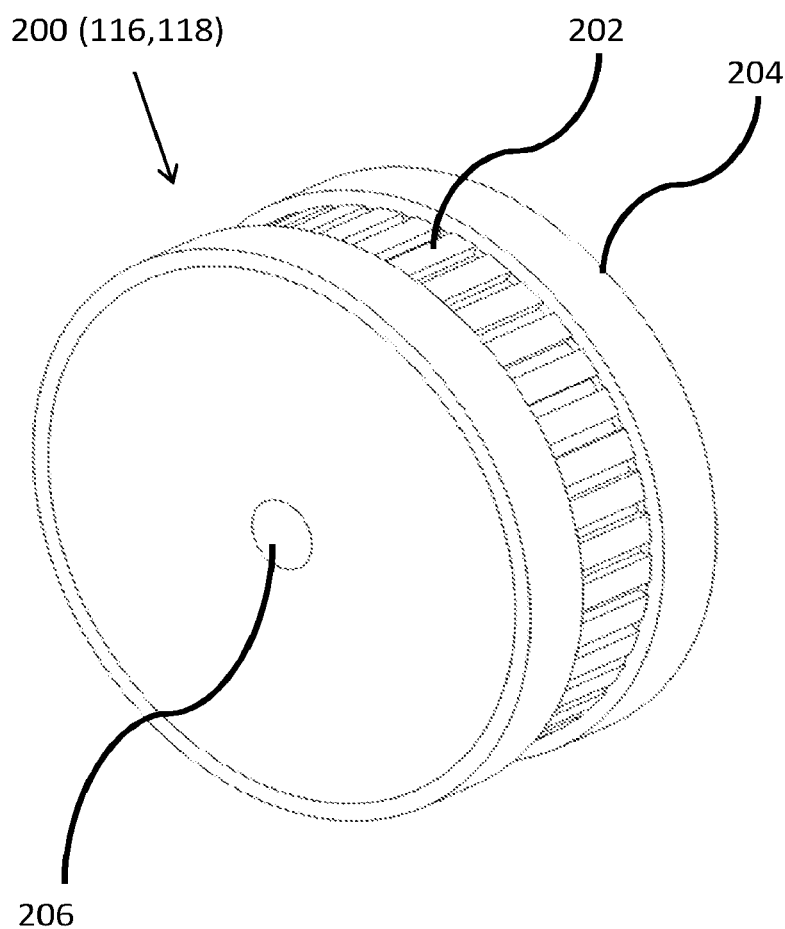
FIG. 13 is a schematic perspective view of a wheel suitable for use in the load handling device of FIGS. 8 to 12.

FIG. 13 shows a wheel 200 suitable for use as one of the wheels 116, 118 of the load handling device 100. The wheel 200 has a toothed central channel 202 that forms a pulley for cooperating with a drive belt 164, 174. The channel 202 is bounded by two rubber tyres 204, which bear upon the rails in use. The wheel 200 can be mounted to an arm 180 by way of an axle (not shown) that extends through an axial hole 206 in the wheel 200. This wheel design is compact and balanced, to minimise wear, and the tyres 204 serve to keep the drive belt 164, 174 in alignment in use.

Figure 14:
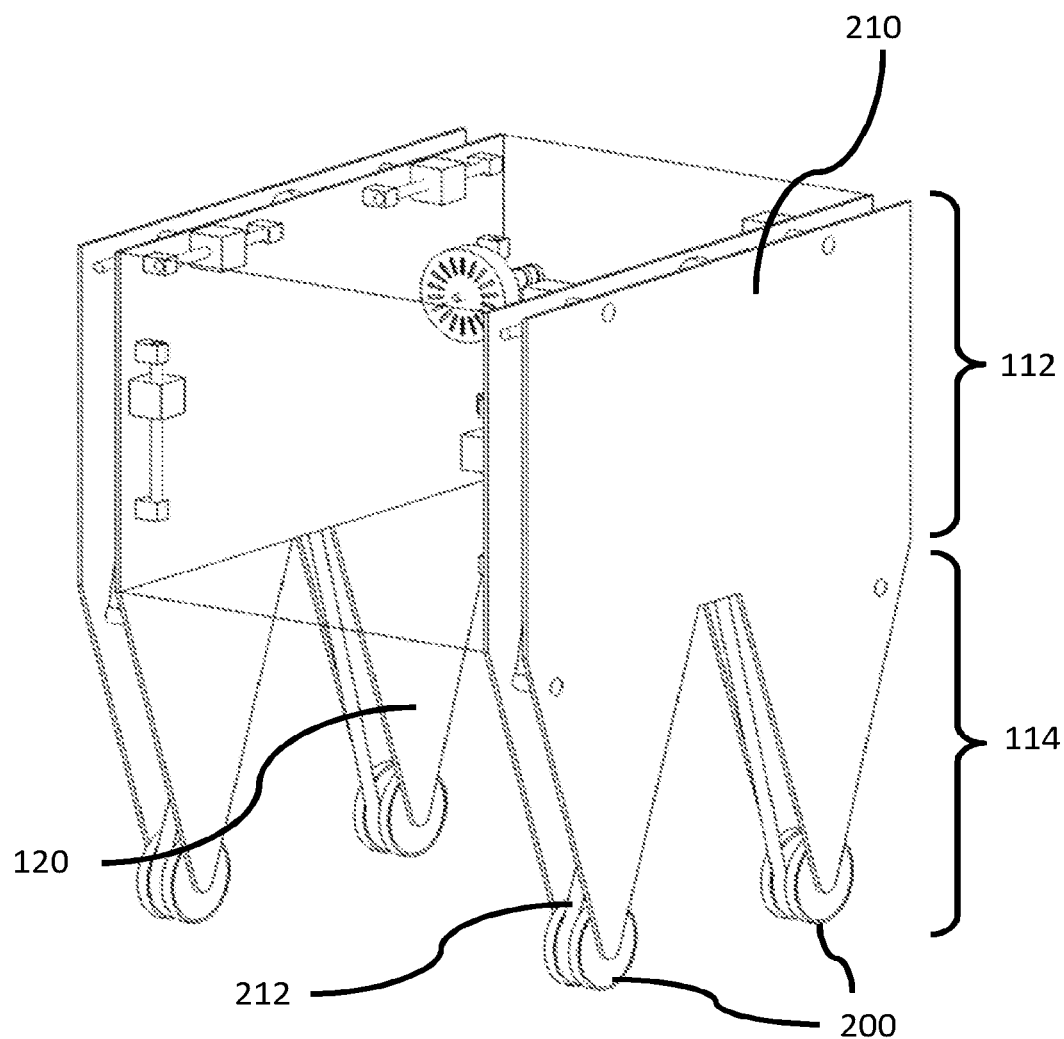
FIG. 14 is a schematic perspective view of part of a load handling device according to another embodiment of the invention.

FIG. 14 shows two wheels 200 mounted in a frame structure 210 of a load handling device according to another embodiment of the invention. As in the previous embodiments, in this embodiment the load handling device comprises a vehicle with an upper part 112 that houses the major components of the device and a lower part having a recess 120 for accommodating a bin, with the wheels 200 being arranged on four sides of the recess (the wheels on only one side are shown in FIG. 14).

In this case, the frame structure 210 comprises two parallel panels that accommodate the wheels 200 therebetween. A drive belt 212 is provided to transfer drive to the wheels 200 from a motor housed in the upper part 112 of the vehicle.

Figure 15:
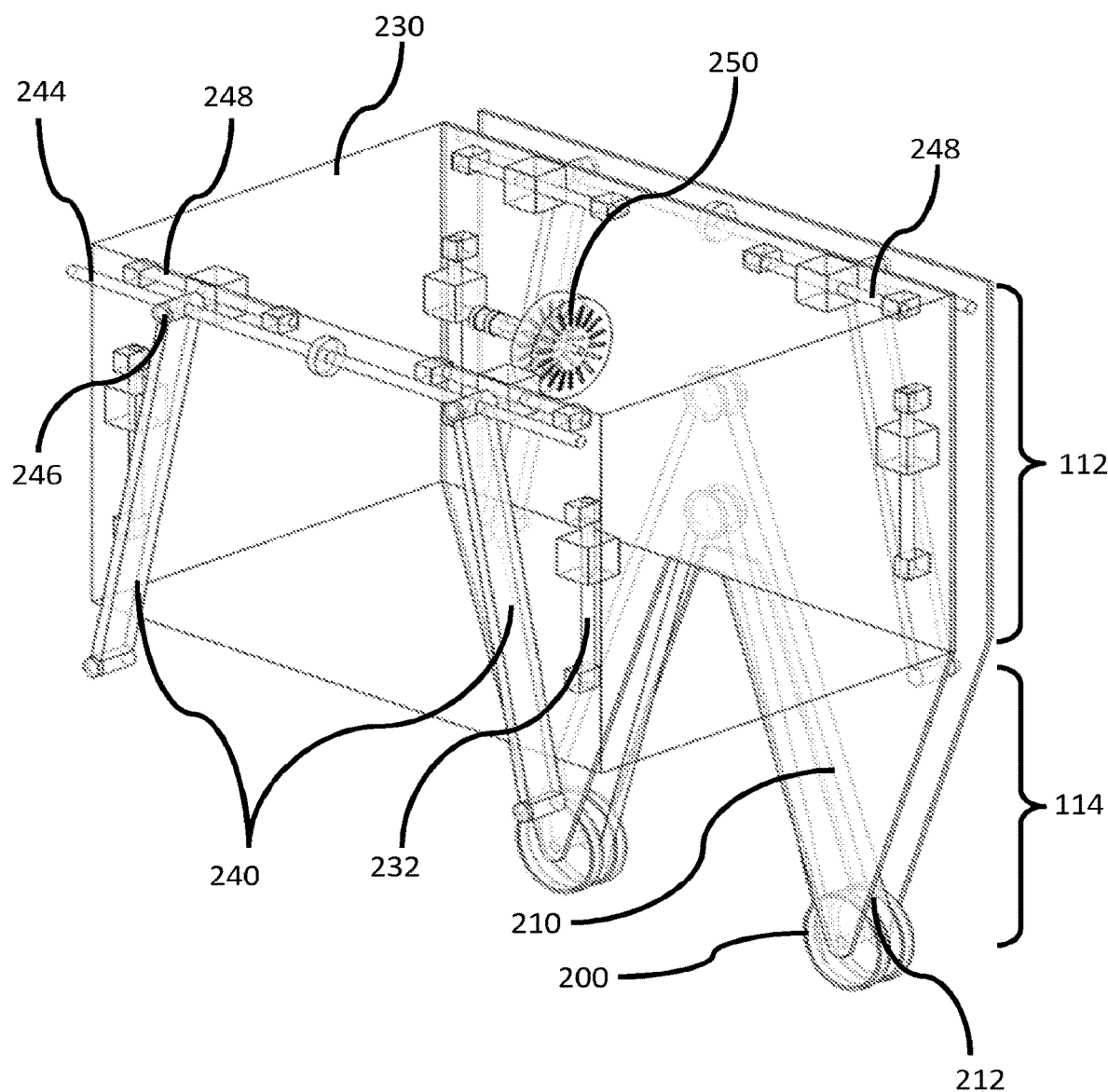
FIGS. 15 and 16 are schematic perspective and side views of internal components of the load handling device of FIG. 14.
Figure 16:
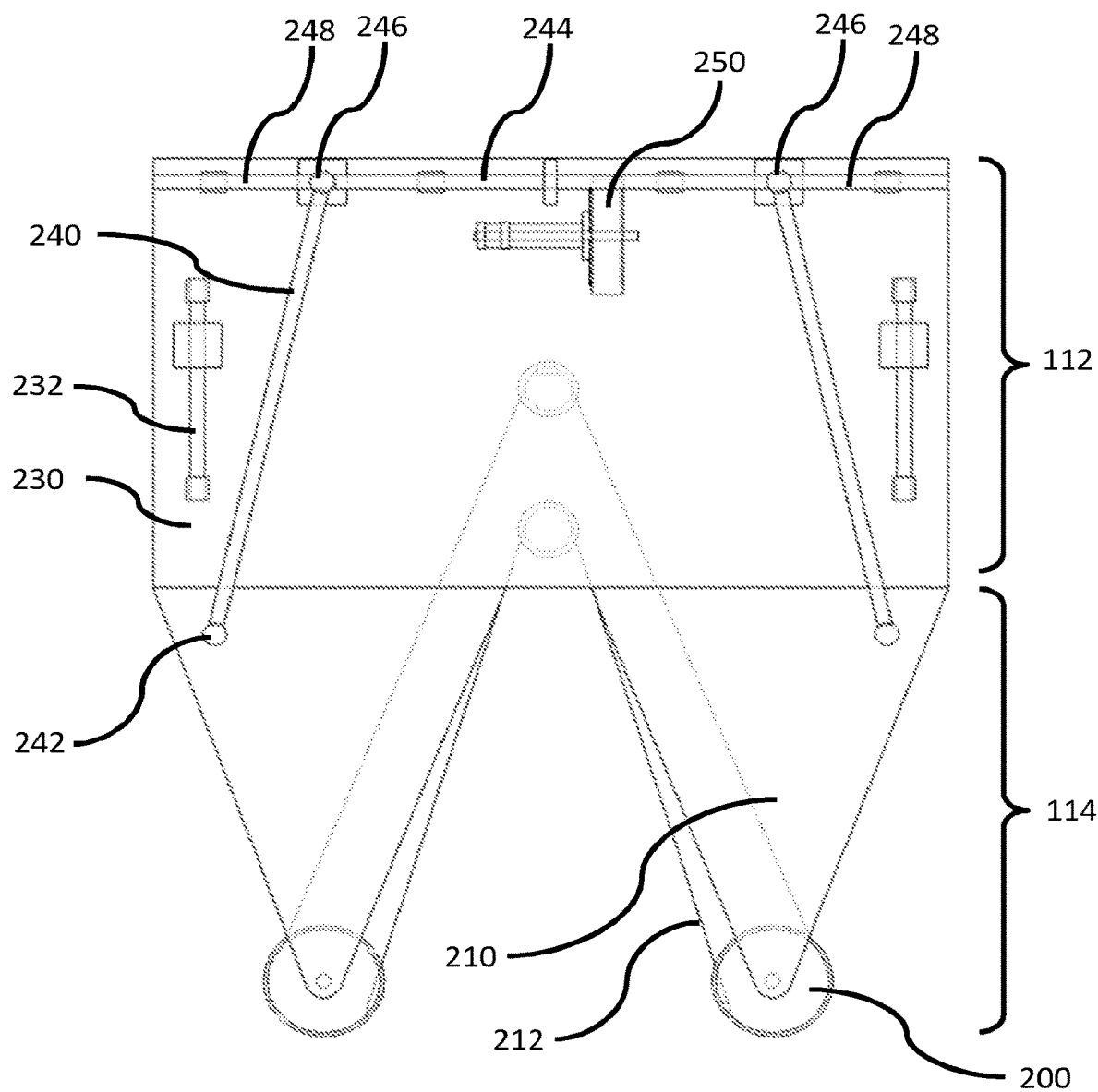

Referring additionally to FIGS. 15 and 16, the wheels 200 in this embodiment can be raised and lowered by moving the frame structure 210 relative to the upper part 112 of the vehicle. The frame structure 210 is mounted to a body 230 of the upper part 112 of the vehicle by way of rails 232. The rails 232 are fixed to the body 230 in a vertical orientation, and the frame structure 210 is slidably mounted to the rails 232.

The frame structure 210 is retained by a pair of linkages 240 that extend between the panels. The bottom ends of the linkages 240 are attached to respective shafts 242 that bridge the gap between the panels. The top ends of the linkages 240 are rotatably attached to threaded bosses 246 that are mounted on a threaded horizontal driveshaft 244. The bosses 246 are slidably attached to horizontal rails 248.

The driveshaft 244 is driven by a motor 250 by way of a drive belt (not shown). When the driveshaft 244 is rotated in a first direction, the top ends of the linkages 240 move apart to push the frame structure 210 downwards, thereby to lower the wheels 200 onto a rail. When the driveshaft 244 is rotated in a second, opposite direction, the top ends of the linkages 240 move together to pull the frame structure 210 upwards, lifting the wheels 200.

Although only one frame structure 210 with two wheels 200 is shown in FIGS. 14 to 16, it will be appreciated that an identical frame structure 210 would be provided on the opposite side of the vehicle. Both frame structures 210 are raised and lowered by a common motor, so the four wheels 200 can be lifted and lowered in unison to control engagement of this first set of wheels 200 with rails extending in a first direction across the frame. Although not shown in FIGS. 14 to 16, the vehicle includes another set of wheels arranged to engage with rails extending in a second, perpendicular direction across the frame when the first set of wheels is lifted.

It will be appreciated that many different variations and modifications are possible. For example, both sets of wheels may be powered by a single motor, with a suitable transfer arrangement to direct power to the appropriate set of wheels. In other embodiments, one or more of the wheels may include an integrated motor or a motor located adjacent the wheel. An example of this is shown in FIG. 17.

Figure 17:
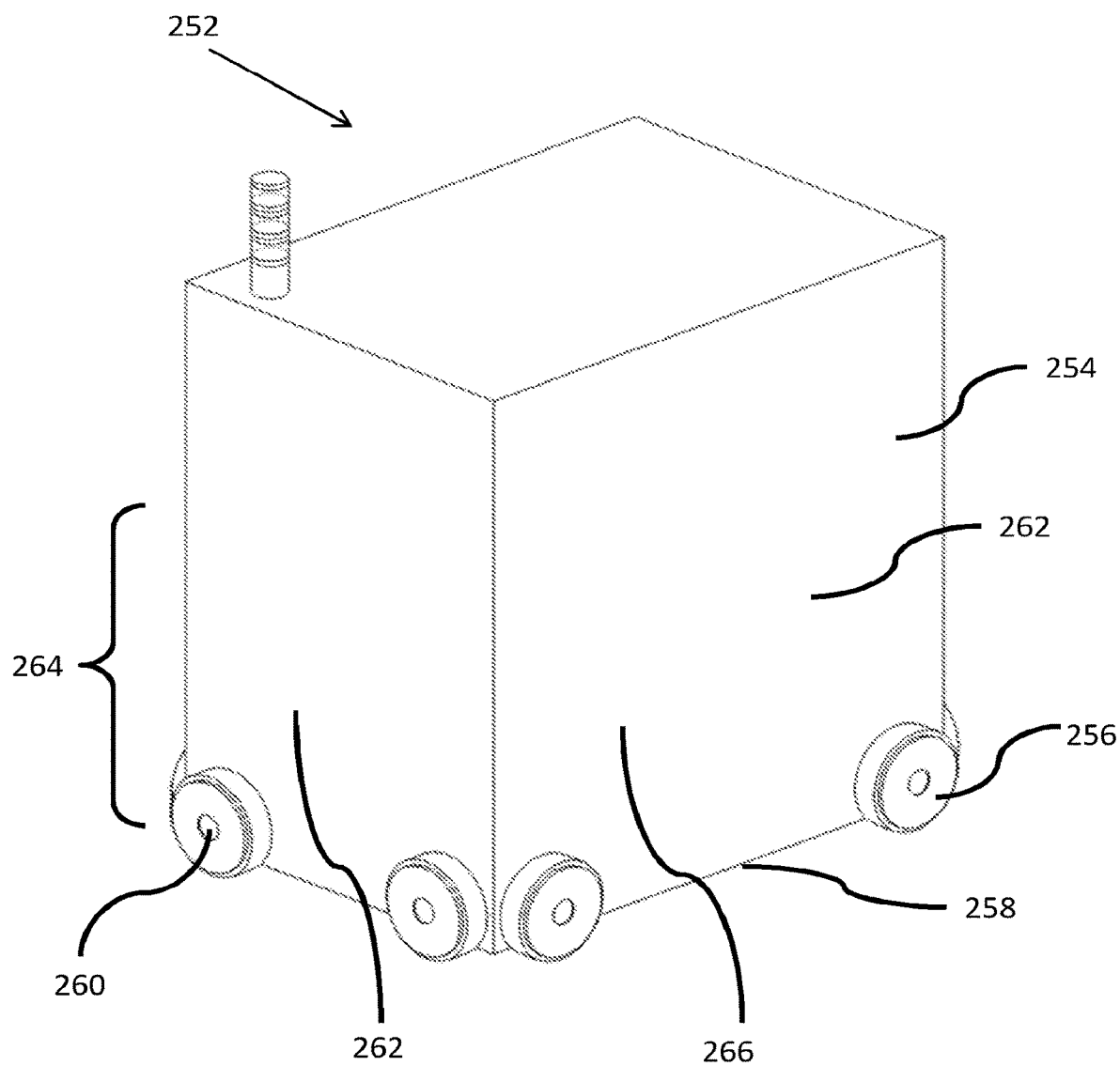
FIG. 17 is a perspective view of a load handling device according to a further embodiment of the invention.

Referring to FIG. 17, this shows a load-handling device 252 according to a further embodiment of the invention. The device 252 has a cuboid-shaped external housing 254 to which a plurality of wheels 258 are mounted near a lower edge 258 of the housing 254. The wheels 256 are motorised hub wheels, with each wheel 256 having a motor integrated within a hub 260 of the wheel 256. The motors are used to drive the respective wheels 256 directly, and hence this embodiment does not require drive belts connected between the wheels and drive motors.

In this example the motors are powered by batteries located within side walls 262 of a lower part 264 of the housing 254, adjacent to a container-receiving space 266 of the device 252. Locating the batteries low down in this way has the advantageous effect of lowering the centre of gravity of the device 252, thereby increasing its stability and allowing higher acceleration and deceleration. The device 252 is otherwise similar to the previous embodiments and contains similar mechanisms for raising and lowering the wheels 256, and a similar lifting device for lifting a container into the container-receiving space 266. The batteries located in the side walls 262 are also used to power these components.

In any of the previously-described embodiments, the mechanism used to lift containers into the container-receiving space could take any suitable form. For maximum stability and load capacity, it is desirable to provide four lifting cables, with one cable disposed near each of the corners of the device, but a different arrangement, for example with fewer cables, could be used if desired. Conveniently, all of the cables are spooled and unspooled using a single motor, but more than one motor could be used if desired.

Instead of a motor, the mechanism used to lift the wheels may use linear actuators, such as linear motors or hydraulic rams. Instead of using battery power, other means of powering the load-handling devices will be apparent to persons skilled in the art, for example using overhead power or by supplying power via the rails on which the devices run.

It will be appreciated that features described in relation to one particular embodiment are Interchangeable with features described in relation to the other embodiments. For example, the motorised hub wheels described in relation to FIG. 17 could be used on any of the other embodiments and/or the batteries could be located low down adjacent the container-receiving space in any of the embodiments to improve stability and increase acceleration/deceleration. Other variations and modifications not explicitly described above will also be apparent to the skilled reader.

The invention claimed is:

1. A load handling device for lifting and moving containers from stacks of containers in a storage system having a plurality of rails or tracks arranged in a grid pattern above the stacks of containers, the grid pattern having a plurality of grid spaces such that each stack of the stacks of containers will be located within a footprint of only a single grid space, the load handling device being configured to move laterally on the plurality of rails or tracks above the stacks of containers the load handling device comprising:
    an external housing having a container-receiving space to be located above the plurality of rails or tracks when in use;
    a lifting device configured to lift a container from a stack of the stacks of containers into the container-receiving space,
    wherein the load handling device is configured to have a footprint that, when in use, will occupy substantially only a single grid space in the storage system; and
    a wheel assembly having a first set of wheels configured to engage with a first set of the plurality of rails or tracks to guide movement of the load handling device in a first direction and a second set of wheels configured to engage with a second set of the plurality of rails or tracks to guide movement of the load handling device in a second direction perpendicular to the first direction, wherein one lateral surface of the external housing facing the first direction extends no farther, along the first direction, than an outermost extension of a pair of wheels of the second set of wheels on that lateral surface of the external housing, and one lateral surface of the external housing facing the second direction extends no farther, along the second direction, than an outermost extension of a pair of wheels of the first set of wheels on that lateral surface of the external housing, such that, when the lifting device begins lifting the container from the stack, the load handling device encompasses:

no more than a first grid space of the storage system in the first direction without obstructing another load handling device occupying or traversing a second grid space of the storage system adjacent the first grid space in the first direction, and the first grid space and no more than part of a third grid space of the storage system adjacent the first grid space in the second direction without obstructing yet another load handling device occupying or traversing a fourth grid space of the storage system adjacent the first grid space in the second direction.

2. The load handling device of claim 1, further comprising:
an upper part housing components which include power components, control components, drive components and/or lifting components, and a lower part including the container-receiving space, wherein the lower part is arranged directly beneath the upper part.

3. The load handling device of claim 1, wherein the external housing substantially encloses the container-receiving space.

4. The load handling device of claim 3, wherein the external housing is shaped substantially as a cuboid.

5. The load handling device of claim 1, wherein at least some of the first set of wheels or the second set of wheels are arranged around a periphery of the container-receiving space.

6. The load handling device of claim 1, further comprising:
a frame structure for supporting the first set of wheels and the second set of wheels.

7. The load handling device of claim 6, wherein the frame structure is part of the external housing.

8. The load handling device of claim 6, wherein the frame structure is arranged around the container-receiving space.

9. The load handling device of claim 6, wherein the container-receiving space is defined within the frame structure.

10. The load handling device of claim 6, wherein the container-receiving space is bounded on four sides by the frame structure.

11. The load handling device of claim 1, wherein one or more of the first set of wheels or the second set of wheels is driven by a motor integrated with the first set of wheels or the second set of wheels or located substantially adjacent to the first set of wheels or the second set of wheels.

12. The load handling device of claim 1, wherein one or more of the first set of wheels or the second set of wheels comprises:
a wheel hub motor.

13. The load handling device of claim 1, wherein one or more of the first set of wheels or the second set of wheels is arranged to be driven by one or more motors located above the container-receiving space.

14. The load handling device of claim 13, further comprising:
drive transfer means disposed around the container-receiving space for transferring drive from the one or more motors to the first set of wheels or the second set of wheels.

15. The load handling device of claim 14, wherein the drive transfer means comprises:
an arrangement of pulleys and drive belts.

16. The load handling device of claim 1, wherein at least one wheel of the first set of wheels or the second set of wheels includes a channel that cooperates with a drive belt for driving the at least one wheel.

17. The load handling device of claim 16, wherein the channel comprises:
a series of teeth for engaging with corresponding formations on the drive belt.

18. The load handling device of claim 16, wherein the channel is bounded by a pair of tyres.

19. The load handling device of claim 1, comprising:
means for selectively engaging and disengaging the first set of wheels with the first set of the plurality of rails or tracks; and
means for selectively engaging and disengaging the second set of wheels with the second set of the plurality of rails or tracks.

20. The load handling device of claim 1, wherein one of the first set of wheels or the second set of wheels is configured to be raised and lowered with respect to the other of the first set of wheels or the second set of wheels.

21. The load handling device of claim 20, further comprising:
one or more wheel lift devices located above the container-receiving space and arranged to lift the first set of wheels or the second set of wheels.

22. The load handling device of claim 21, wherein the one or more wheel lift devices are configured to lift the first set of wheels or the second set of wheels via a linkage located in a lower part of the load handling device adjacent to the container-receiving space.

23. The load handling device of claim 1, wherein one or more wheels of the first set of wheels secured to the external housing have an outer surface that faces outwardly from the external housing, and one or more wheels of the second set of wheels secured to the external housing have an outer surface that faces outwardly from the external housing.

24. The load handling device of claim 1, wherein two or more wheels of the first set of wheels secured to the external housing have an outer surface that faces outwardly from the external housing, and two or more wheels of the second set of wheels secured to the external housing have an outer surface that faces outwardly from the external housing.

25. The load handling device of claim 1, wherein when the lifting device begins lifting the container from the stack, the external housing encompasses the first grid space and no more than half of the third grid space.

26. The load handling device of claim 1, wherein when the lifting device begins lifting the container from the stack, the external housing encompasses no more than the first grid space.

27. The load handling device of claim 1, wherein another lateral surface of the external housing facing the first direction extends no farther, along the first direction, than an outermost extension of another pair of wheels of the second set of wheels on that other lateral surface of the external housing.

28. A storage system comprising:
a first load handling device;
a second load handling device; and
a third load handing device,
each of the first, second, and third load handling devices comprising:
  a housing comprising four lateral surfaces and a top surface that at least partly enclose an inner portion of the housing, the inner portion comprising a container receiving space;
  a first plurality of wheels configured to engage a first set of rails of a grid frame to guide movement of the load handling device in an X-direction along a top side of the grid frame;
  a second plurality of wheels configured to engage a second set of rails of the grid frame to guide movement of the load handling device in a Y-direction perpendicular to the X-direction along the top side of the grid frame,
  wherein two adjacent rails of the first set of rails and two adjacent rails of the second set of rails define a grid space for the grid frame; and
  a container lifting device positioned in the housing and comprising a container-lift motor configured to lift one container into the container receiving space from stacks of containers within the grid frame beneath the top side of the grid frame,
  wherein one lateral surface of the housing facing the X-direction extends no farther, along the X-direction, than an outermost extension of a pair of wheels of the second plurality of wheels on that lateral surface of the housing, and one lateral surface of the housing facing the Y-direction extends no farther, along the Y-direction, than an outermost extension of a pair of wheels of the first plurality of wheels on that lateral surface of the housing, such that, when the container lifting device of the first load handling device begins lifting a container from one of the stacks of containers, the first load handling device encompasses:
    no more than a first grid space of the grid frame in the X-direction without obstructing the second load handling device occupying or traversing a second grid space of the grid frame adjacent the first grid space in the X-direction, and
    the first grid space and no more than part of a third grid space of the grid frame adjacent the first grid space in the Y-direction without obstructing the third load handling device occupying or traversing a fourth grid space of the grid frame adjacent the first grid space in the Y-direction.

29. The storage system of claim 28, wherein in each of the first, second, and third load handling devices: one or more wheels of the first plurality of wheels secured to the housing have an outer surface that faces outwardly from the housing, and one or more wheels of the second plurality of wheels secured to the housing have an outer surface that faces outwardly from the housing.

30. The storage system of claim 28, wherein in each of the first, second, and third load handling devices: two or more wheels of the first plurality of wheels secured to the housing have an outer surface that faces outwardly from the housing, and two or more wheels of the second plurality of wheels secured to the housing have an outer surface that faces outwardly from the housing.

31. The storage system of claim 28, wherein in each of the first, second, and third load handling devices: the container-lift motor is positioned in the housing above the container receiving space and below the top surface of the housing.

32. The storage system of claim 28, wherein in each of the first, second, and third load handling devices: one or more wheels of the first plurality of wheels and the second plurality of wheels are arranged around a periphery of the container receiving space, such that the one or more wheels of the first plurality of wheels and the second plurality of wheels do not encroach upon the container receiving space.

33. The storage system of claim 28, wherein when the container lifting device of the first load handling device begins lifting the container from the one of the stacks of containers, the first load handling device encompasses the first grid space and no more than half of the third grid space.

34. The storage system of claim 28, wherein when the container lifting device of the first load handling device begins lifting the container from the one of the stacks of containers, the first load handling device encompasses no more than the first grid space.

35. The storage system of claim 28, wherein in each of the first, second, and third load handling devices: another lateral surface of the housing facing the X-direction extends no farther, along the X-direction, than an outermost extension of another pair of wheels of the second plurality of wheels on that other lateral surface of the housing.

36. The storage system of claim 28, wherein in each of the first, second, and third load handling devices: the housing is shaped substantially as a cuboid.

37. The storage system of claim 28, further comprising:
means for engaging the first plurality of wheels with the first set of rails; and
means for engaging the second plurality of wheels with the second set of rails.

38. The storage system of claim 28, wherein in each of the first, second, and third load handling devices: one of the first plurality wheels or the second plurality of wheels is configured to be raised and lowered with respect to the other of the first plurality wheels or the second plurality of wheels.

* * * * *

UNITED STATES PATENT AND TRADEMARK OFFICE
CERTIFICATE OF CORRECTION

| | | |
|---|---|---|
| PATENT NO. | : 11,851,275 B2 | Page 1 of 1 |
| APPLICATION NO. | : 17/078689 | |
| DATED | : December 26, 2023 | |
| INVENTOR(S) | : Lindbo et al. | |

It is certified that error appears in the above-identified patent and that said Letters Patent is hereby corrected as shown below:

In the Claims

In Column 12, Line 53, Claim 1, delete "containers" and insert --containers,--.

In Column 15, Line 7, Claim 28, delete "handing" and insert --handling--.

Signed and Sealed this
Sixteenth Day of July, 2024

Katherine Kelly Vidal
*Director of the United States Patent and Trademark Office*